United States Patent
Ramello et al.

(10) Patent No.: US 11,492,674 B2
(45) Date of Patent: Nov. 8, 2022

(54) PROCESS FOR THE PRODUCTION OF SUGARS FROM BIOMASS DERIVED FROM GUAYULE PLANTS

(71) Applicant: VERSALIS S.P.A., San Donato Milanese (IT)

(72) Inventors: Stefano Ramello, Novara (IT); Mario Baldassarre, Novara (IT); Roberto Buzzoni, Chivasso (IT)

(73) Assignee: Versalis S.P.A., San Donato (IT)

( * ) Notice: Subject to any disclaimer, the term of this patent is extended or adjusted under 35 U.S.C. 154(b) by 60 days.

(21) Appl. No.: 16/964,703

(22) PCT Filed: Jan. 23, 2019

(86) PCT No.: PCT/IB2019/050555
§ 371 (c)(1),
(2) Date: Jul. 24, 2020

(87) PCT Pub. No.: WO2019/145865
PCT Pub. Date: Aug. 1, 2019

(65) Prior Publication Data
US 2021/0054468 A1  Feb. 25, 2021

(30) Foreign Application Priority Data
Jan. 24, 2018  (IT) .................. 102018000001725

(51) Int. Cl.
*C13K 13/00*  (2006.01)
(52) U.S. Cl.
CPC .................. *C13K 13/002* (2013.01)
(58) Field of Classification Search
CPC ........... C13K 13/002; C13K 1/02; C13K 1/06
See application file for complete search history.

(56) References Cited

U.S. PATENT DOCUMENTS

| 8,968,479 B2 * | 3/2015 | Kilambi ............... D21C 3/22 127/44 |
| 9,150,937 B2 | 10/2015 | Hung et al. |
| 2015/0299816 A1 | 10/2015 | Colakyan et al. |
| 2018/0087254 A1 | 3/2018 | Lloyd et al. |

FOREIGN PATENT DOCUMENTS

| EA | 018491 B1 | 8/2013 | |
| JP | 2012161258 A | 8/2012 | |
| RU | 2516791 C2 | 5/2014 | |
| WO | 2015/087254 A1 | 6/2015 | |
| WO | WO-2015087254 A1 * | 6/2015 | ............... C13K 1/06 |
| WO | WO-2016090046 A1 * | 6/2016 | ............... C12P 7/10 |

OTHER PUBLICATIONS

SBAR: Biochemical Characterization of Guayule Bagasse [online], [retrieved on Dec. 1, 2021], Retrieved from the internet:< URL: https://sbar.arizona.edu/research/characterizations-co-products > (Year: 2021).*
International Search Report dated May 10, 2019 for PCT application No. PCT/IB2019/050555.
Written Opinion dated May 10, 2019 for PCT application No. PCT/IB2019/050555.
Russian Office Action dated May 30, 2022 from corresponding Russian Application No. 2020127739, 10 pages.

* cited by examiner

*Primary Examiner* — Stefanie J Cohen
*Assistant Examiner* — Ritu S Shirali
(74) *Attorney, Agent, or Firm* — Ruggiero McAllister & McMahon LLC

(57) ABSTRACT

A process for production of sugars from biomass derived from guayule plants includes placing a certain amount of the biomass in contact with a certain amount of water and with at least one organic acid. The sugars thus obtained may advantageously be used as sources of carbon in fermentation processes for the production of alcohols, lipids, diols, or in chemical synthesis processes for the production of other intermediates or chemicals.

20 Claims, No Drawings

PROCESS FOR THE PRODUCTION OF SUGARS FROM BIOMASS DERIVED FROM GUAYULE PLANTS

The present invention relates to a process for the production of sugars from biomass derived from guayule plants.

More specifically, the present invention relates to a process for the production of sugars from biomass derived from guayule plants comprising placing a certain amount of said biomass in contact with a certain amount of water and with at least one organic acid, and optionally at least one inorganic acid, obtaining a mixture, said at least one organic acid and said at least one inorganic acid optionally present being used in such amounts that the total moles of said at least one organic acid and said at least one inorganic acid optionally present contained in said mixture are calculated according to the specific equations and the specific algorithm below reported.

The sugars thus obtained may advantageously be used as sources of carbon in fermentation processes for the production of alcohols (e.g., ethanol, butanol), lipids, diols (e.g., 1,3-propanediol, 1,3-butanediol, 1,4-butanediol, 2,3-butanediol), or in chemical synthesis processes for the production of other intermediates or chemicals. Said alcohols and lipids may in turn advantageously be used in the production of biofuels (e.g., biodiesel or "Green Diesel"), which may be used as such or in blends with other automotive fuels, while said diols may be used in the production of products such as, for example, bio-butadiene, which may in turn be used in the production of rubbers (e.g., polybutadiene or its copolymers). Said uses are particularly important in the case of a biorefinery.

The production of sugars from biomass, in particular from lignocellulosic biomass, is known in the art.

Natural rubber is a hydrocarbon polymer (cis-1,4-polyisoprene) present in hundreds of plant species in the form of an aqueous emulsion normally referred to as latex. The main source of natural rubber is *Hevea brasiliensis*, a tree native to the Amazon, and South America remained the main source for the limited amounts of latex required throughout the nineteenth century. At the present time, the American plantations have been almost completely abandoned due to pests and diseases and the production of natural rubber is almost entirely concentrated in Southeast Asia.

To overcome the drawbacks of a production that is always exposed to diseases and attack by parasites several methods for the production of synthetic rubbers were developed during the twentieth century, culminating in the discovery of Ziegler-Natta catalysts, which may polymerise isoprene with very high regional- and stereo-selectivity, obtaining a cis-1,4 synthetic polyisoprene that is almost indistinguishable from that of plant origin. Natural rubber has not however been completely replaced because some of its mainly mechanical properties are actually a consequence of the small amounts of lipids and proteins present in it. Thus, the total output of rubber in 2013 (27.5 Mt) still included 12 Mt (43%) of natural rubber.

However, the production of rubber from *Hevea brasiliensis* brings with it some technical and ethical problems. In fact, it is always possible that the same diseases and parasites that destroyed the American plantations could also affect those in South-East Asia. Furthermore, latex harvesting requires a large amount of labour and is only profitable because said labour is paid at extremely low wages. For these reasons alternative sources of natural rubber are being sought. Among these, the guayule (*Parthenium argentatum*) is certainly one of the most promising.

The guayule (*Parthenium argentatum*) is a perennial shrub native to the semi-desert regions of south-west USA (particularly Texas) and northern Mexico. This plant accumulates natural rubber, mainly consisting of cis-1,4-polyisoprene elastomer, in the form of latex (a milky suspension or dispersion in water) especially in the bark of branches and of stem. The natural rubber content may depend on various environmental, cultivation and preservation factors and is between 5% and 20% of the total weight of the dry plant.

The extraction of natural rubber from the guayule plant (*Parthenium argentatum*), as well as other non-Hevea plants belonging, for example, to the genera Asteraceae, Euphorbiaceae, Campanulaceae, Labiatae and Moraceae such as, for example, *Euphorbia lathyris, Parthenium incanum, Chrysothamnus nauseosus, Pedilanthus macrocarpus*, Cryptostegia *grandiflora, Asclepias syriaca, Asclepias speciosa, Asclepias subulata, Solidago altissima*, Solidago gramnifolia, Solidago rigida, *Sonchus arvensis*, Silphium spp., *Cacalia atriplicifolia*, Taraxacum kok-saghyz, *Pycnanthemum incanum*, Teucreum canadense, *Campanula americana* (indicated for brevity by the term "guayule type"), is an important alternative to the extraction of natural rubber from *Hevea brasiliensis*, especially in view of the higher resistance of said species to the pathogens that attack Hevea, the lower cost of importing the raw material of plant origin and because of the lower content of many protein contaminants responsible for type I (or IgE mediated) latex allergies in the rubbers extracted from said plants with respect to that derived from Hevea.

The production of natural rubber from guayule is however only profitable if all the other fractions that make up the plant are also utilised: mainly the resin (present in amounts comparable to that of rubber) and the lignocellulosic fraction, as well as small amounts of essential oils and waxes. In particular, after extraction of the rubber and resin, as extensively described in the scientific and patent literature, the lignocellulosic residue (bagasse), comprising lignin and polysaccharides, must undergo the process of saccharification which consists of hydrolysis of the polysaccharides [which are thus transformed into sugars having 5 carbon atoms (C5) and six carbon atoms (C6) dissolved in the hydrolysate obtained] and leaves a solid residue comprising lignin. The sugars thus obtained may then be used as feedstock in processes for producing organic intermediates by fermentation, while lignin may be utilised as fuel or in other ways.

It is important to note that, while the natural rubber obtained from *Hevea brasiliensis* is obtained by collecting the latex present in the lactiferous ducts along the bark by making incisions to said ducts in the bark, the natural rubber of the guayule accumulates inside the cells of the plant (stem, leaves and roots) and may be obtained by crushing the plant material and collecting the cellular components using physical and/or chemical methods.

For example, international patent application WO 2013/134430 describes a process for extracting natural rubber from non-Hevea plants which involves harvesting the guayule plants, removing most of the leafy parts and partly drying the plant material. After crushing and grinding, the plant material is suspended in the presence of a polar organic solvent (for example, acetone) and an apolar organic solvent (for example, hexane). After separating the bagasse from the suspension, a suspension containing rubber and resin, miscella, is obtained. More polar organic solvent is added to said miscella to cause the rubber to coagulate into particles, which are separated out by sedimentation.

Processing of the guayule plant therefore yields resin mostly consisting of terpene compounds, mainly dispersed in the woody fraction. Guayule resin has long been used for a variety of purposes including, for example, the manufacture of adhesives and the production of pest-resistant wood panels. For this reason importance is also given to the isolation of said resin in some process described in the known art.

For example, U.S. Pat. No. 4,435,337 describes a process for extracting rubber, resin, water-soluble compounds and bagasse. In particular, said process comprises: (a) a stage of partly drying the plant material to a moisture content of between 5% by weight and 25% by weight; (b) extracting the resin with an essentially anhydrous oxygenated organic solvent (for example, anhydrous acetone) and (c) recovering the rubber, water-soluble compounds and bagasse by flotation of the rubber material. In said patent, it is pointed out that resin extraction is all the more efficient the lower the amounts of water present in the extracting solvent; furthermore, it has unexpectedly been found that in order to extract the resin from the plant material it is more advantageous to use a miscella containing concentrated resin with respect to the use of fresh solvent.

Patent application US 2014/0288255 describes a process for separating rubber, resin and bagasse, comprising a first stage of partial homogenisation of the plant material in the presence of a medium capable of solubilising the resin, which is then separated from the bagasse; a second stage of partly homogenising the bagasse in the presence of a solvent capable of solubilising the rubber which is then separated from the bagasse; a final stage of drying the rubber and the bagasse which may, for example, comprise evaporation of the solvent in a thin-film evaporator ("wiped-film evaporator") and extrusion of the rubber. Said patent application also describes a process wherein the plant material is homogenised in the presence of a "grinding solvent" capable of solubilising the rubber and resin, which are separated from each other at a later purification stage using a fractionation solvent.

The lignocellulosic residue (bagasse) obtained after extraction of latex and resin from the guayule plants is a complex structure comprising three main components: cellulose, hemicellulose and lignin.

As known in the art, the relative amounts of said three components in the lignocellulosic biomass that may be used to produce sugars, vary depending on the type of lignocellulosic biomass used. For example, said amounts vary depending on the species and the age of the plant.

Cellulose is the largest constituent of lignocellulosic biomass and is generally present in amounts between 30% by weight and 60% by weight with respect to the total weight of lignocellulosic biomass. Cellulose is made up of glucose molecules (about 500 to 10000 units) joined together by $\beta$-1,4-glucoside bonds. The formation of hydrogen bonds between the chains brings about the formation of crystalline domains that impart strength and elasticity to the plant fibres. In nature it is found in the pure state only in annual plants such as cotton and flax, while in woody plants it is always accompanied by hemicellulose and lignin.

Hemicellulose, which is generally present in amounts between 10% by weight and 40% by weight with respect to the total weight of lignocellulosic biomass, is a relatively short (from 10 to 200 molecules) and branched mixed polymer, formed both of sugars with six carbon atoms (glucose, mannose, galactose), and sugars with five carbon atoms (xylose, arabinose). Some important properties of plant fibres, the main one of which is to facilitate imbibition of said plant fibres when water is present, causing swelling, are due to the presence of hemicellulose. Hemicellulose also has adhesive properties and therefore tends to harden or to become of a horny consistency, with the result that said plant fibres become rigid and soak more slowly.

Lignin is generally present in amounts between 10% by weight and 30% by weight with respect to the total weight of lignocellulosic biomass. Its main function is to bind and bond the various plant fibres together to give the plant compactness and strength and also provides protection against insects, pathogens, lesions and ultraviolet light. It is mainly used as a fuel but it is also currently widely used in industry as a dispersant, hardener, emulsifier, for plastics laminates, cartons and rubber products. It may also be chemically treated to produce aromatic compounds, such as vanillin, syringaldehyde, p-hydroxybenzaldehyde, which may be used in pharmaceutical chemistry, or in the cosmetic and food industries.

To optimise the conversion of lignocellulosic biomass into products for energy use, it is known subjecting said biomass to a preliminary treatment to separate the lignin and hydrolyse the cellulose and hemicellulose to simple sugars such as, for example, glucose and xylose, which may then undergo fermentation processes.

The process normally used for said purpose is acid hydrolysis, which may be carried out in the presence of dilute or concentrated strong acids.

For example, U.S. Pat. No. 6,423,145 describes a process for hydrolysing a lignocellulosic biomass to obtain a large amount of fermentable sugars comprising: impregnating the lignocellulosic material with a mixture comprising a dilute acid catalyst (for example, sulfuric acid, hydrochloric acid, nitric acid, sulfur dioxide, or any other strong acid capable of providing a pH value lower than approximately 3) and a catalyst based on a metal salt (for example, ferrous sulfate, ferric sulfate, ferric chloride, aluminium sulfate, aluminium chloride, magnesium sulfate) in such an amount as to provide a yield of fermentable sugars higher than that one obtained in the presence of dilute acid alone; feeding the impregnated lignocellulosic material to a reactor and heating (for example, to a temperature of between 120° C. and 240° C.) for a sufficient time (for example, for a time of between 1 minute and 30 minutes) to hydrolyse substantially all the hemicellulose and more than 45% of the cellulose to water-soluble sugars; recovering the water-soluble sugars.

International patent application WO 2010/102060 describes a process for the pre-treatment of biomass to be used in a biorefinery to obtain a fermentation product comprising the following stages: subjecting the biomass to treatments (for example, removal of unwanted materials, grinding) before sending it to pre-treatment; subjecting the biomass to pre-treatment by applying a dilute acid (for example, sulfuric acid) in a concentration between about 0.8% by weight and about 1.1% by weight, at a temperature of between about 130° C. and about 170° C., for a time of between about 8 minutes and about 12 minutes; wherein the fermentation product may be obtained by separating the pre-treated biomass into a liquid component comprising xylose and a solid component from which glucose may be made available and recovering the xylose for fermentation; wherein the biomass includes lignocellulosic material and wherein the lignocellulosic material includes corn cobs, corn plant husks, corn plant leaves and corn plant stalks.

International patent application WO 2010/071805 describes a process for pre-treating lignocellulosic material comprising: exposing the lignocellulosic material to a first pre-treatment carried out under low severity operating conditions to obtain a first product; contacting said first product with a dilute acid in aqueous solution (for example, sulfuric acid, sulfurous acid, sulfur dioxide, phosphoric acid, carbonic acid) to obtain a second product. Said two-stage process may provide useful products for the production of bioethanol. US Patent Application 2010/0227369 describes a method for producing a fermentation product in a biomass fermentation system that has been pre-treated and separated into a first component and a second component comprising the following stages: feeding the first component to a fermentation system; providing an organism capable of producing ethanol ("ethanologen") to the fermentation system; maintaining the first component and the organism capable of producing ethanol ("ethanologen") in the fermentation system at a temperature of between about 26° C. and about 37° C. and a pH of between about 4.5 and about 6.0, for a period of not lower than 18 hours; recovering the fermentation product from the fermentation system; wherein the organism capable of producing ethanol ("ethanologen") is fed to the fermentation system in an amount lower than 150 grams of organism capable of producing ethanol ("ethanologen") (dry weight) per litre of first component; wherein the biomass includes lignocellulosic material; wherein the lignocellulosic material comprises at least one of the following: corn cobs, corn plant husks, corn plant leaves and corn plant stalks; wherein the first component comprises a pentose; wherein the pentose comprises xylose; wherein the organism capable of producing ethanol ("ethanologen") is capable of fermenting xylose into ethanol. Preferably, the biomass is pre-treated by contacting the biomass with an acid such as, for example, sulfuric acid, hydrochloric acid, nitric acid, phosphoric acid, acetic acid, or mixtures thereof.

US patent application 2008/0274509 describes a process for preparing a hydrolysate from a lignocellulosic material comprising: a) pre-treating said lignocellulosic material with a compound selected from the group consisting of: sulfuric acid, alkalis, peroxydisulfates, potassium peroxide, and mixtures thereof, in the presence of water, obtaining an aqueous phase; and b) after removing the aqueous phase and washing of the product obtained, treating said product with an enzyme useful for hydrolysis in the presence of water, obtaining a hydrolysate, said hydrolysate being capable of being used as a source of carbon for fermentation.

Tsoutsos, T. et al. in "*Energies*" (2011), Vol. 4, pg. 1601-1623, describe optimisation of the production of fermentable sugar solutions for the production of bioethanol from lignocellulosic biomass. About this, the lignocellulosic biomass is subjected to a two-stage hydrolysis process in the presence of a dilute acid. In particular, tests were carried out in the presence of acids (for example, hydrochloric acid, sulfuric acid, phosphoric acid, nitric acid) diluted to concentrations of down to 3%-4% and at temperatures between 100° C. and 240° C. At temperatures between 110° C. and 140° C. hydrolysis of the hemicellulose occurs, while crystalline cellulose remains practically unchanged up to 170° C. and is hydrolysed at 240° C. Gonzáles-Hernandez, J. C. et al. in "*Journal of the Mexican Chemical Society*" (2011), Vol. 56 (4), pg. 395-401, describe the hydrolysis of polysaccharides from tamarind seeds. In particular, tamarind seeds were hydrolysed under different operating conditions, i.e. at a temperature of between 86° C. and 130.2° C.; with a nitric acid or sulfuric acid concentration of between 0.32% and 3.68% (v/v); and for a contact time of between 13.2 minutes and 40 minutes. It was found that temperature and time are the factors that most influence hydrolysis of the sugars: in particular, the best operating conditions for both acids were: a temperature of 130.2° C., a concentration of 2% (v/v), a contact time of 30 minutes, with a sugar yield of about 110 g/l.

Shatalov, A. A. et al. in "*Chemical Engineering & Process Technology*" (2011), Vol. 2, Issue 5, pg. 1-8, describe the production of xylose by hydrolysis in the presence of dilute sulfuric acid, at low temperature, in a single stage, from thistle (*Cynara cardunculus* L.). In particular, operating under optimum conditions, i.e. temperature of 138.5° C., time of 51.7 minutes, acid concentration of 1.28%, xylose recovery of 86% was achieved, with little degradation of cellulose and a small production of furfural (glucose=2.3 g and furfural (F)=1.04 g per 100 g of thistle, respectively).

The above processs may however have some drawbacks.

For example, if acid hydrolysis is carried out at high temperatures, for example above 140° C., reaction by-products such as, for example, furfural (F), hydroxymethylfurfural (HMF) and phenolic compounds may be formed from sugar dehydration and from the partial depolymerisation of lignin, which act as inhibitors of growth of the microorganisms normally used in subsequent sugar fermentation processes, resulting in a significant fall in the efficiency and productivity of said processes.

If, on the contrary, acid hydrolysis is carried out at low temperatures, for example below 140° C., poor destructuring of the lignocellulosic biomass, destructuring which is necessary for the cellulose fibres to be freed from the lignin network covering them so that they may advantageously be used in the following stage of enzymatic hydrolysis, may occur. In fact, cellulose fibres covered by lignin are difficult for the enzymes (for example, cellulase) normally used in enzymatic hydrolysis to reach.

Efforts to overcome the above-mentioned problems have therefore been made in the art. For example, international patent application WO 2010/069583 describes a process for the production of one or more sugars from biomass including at least one polysaccharide which comprises placing a biomass in contact with an aqueous solution of at least one organic acid, preferably p-toluene-sulfonic acid, 2-naphthalene-sulfonic acid, 1,5-naphthalene-disulfonic acid, at a temperature of 160° C. or above, preferably between 160° C. and 230° C. Said patent application also mentions alkyl sulfonic acids having from 4 to 16 carbon atoms, preferably from 8 to 12 carbon atoms, and even more preferably octyl-sulfonic acid and dodecyl-sulfonic acid. However, the only examples of hydrolysis reported relate to the use of 2-naphthalene-sulfonic acid.

International patent application WO 2010/015404 describes a process for the production of sugars from biomass including at least one polysaccharide which comprises placing a biomass in contact with an aqueous solution of at least one organic acid having from 7 to 20 carbon atoms, preferably from 9 to 15 carbon atoms, more preferably p-toluene-sulfonic acid, 2-naphthalene-sulfonic acid, 1,5-naphthalene-disulfonic acid, at a temperature of between 80° C. and 140° C., preferably between 100° C. and 125° C.

International patent application WO 2015/087254, in the name of the Applicant, describes a process for the production of sugars from biomass including at least one polysaccharide, comprising placing said biomass in contact with an aqueous solution of at least one organic acid having from 1 to 6 carbon atoms, preferably from 1 to 3 carbon atoms, the pH of said aqueous solution being between 0.6 and 1.6, preferably between 0.9 and 1.3. Preferably, said at least one organic acid may be selected from among alkyl sulfonic acids having general formula (I):

$$R-SO_3H \qquad (I)$$

wherein R represents a linear or branched $C_1$-$C_6$ alkyl group.

US patent application 2017/218094 in the name of the Applicant relates to an integrated process for the processing and utilisation of every part of the guayule plant, comprising the following steps in sequence:

- separating stems and branches from the leaves of said plant through mechanical treatment;
- treating the leaves to produce waxes and essential oils, and a fraction including cellulose, hemicellulose and to a lower extent salts, organic compounds and lignin;
- extracting a liquid phase from the stem and branches, thus forming a first solid woody residue, referred to as bagasse;
- treating said first solid woody residue to form sugars, cellulose, hemicellulose and lignin.

The aforesaid integrated process is said to be able to make further use of the guayule plant by combining the production of latex, rubber, resin and bagasse with the production of fermentable sugars. Fermentable sugars are produced by subjecting the bagasse obtained to a two-stage saccharification treatment: in the first stage acid hydrolysis is carried out in the presence of organic acids such as, for example, alkyl-phosphonic or alkyl sulfonic acids, to transform hemicellulose into monomer sugars having 5 carbon atoms (C5), while in the second stage enzymatic, chemical or thermochemical hydrolysis is carried out to obtain monomer sugars having 6 carbon atoms (C6).

The Applicant has, however, noted that use of the organic acids described above having the general formula (I) does not always make it possible to obtain the desired results, particularly in terms of sugar yield and of production of by-products, either when using a biomass derived from guayule plants as such, or when using a bagasse resulting from extraction processes to which guayule plants may have been subjected as known in the art described, for example, in US patent application 2017/218094 or in international patent application WO 2017/103769 in the name of the Applicant, or in U.S. Pat. No. 4,435,337, for example:

- a bagasse obtained by operating according to the process described in Example 2 of U.S. Pat. No. 4,435,337, included therein as a reference [sample identified as GR-2 in said patent and referred to as "bagasse (1)" in the following examples]; or
- a bagasse obtained by operating according to the processs described in Examples 1-3 of international patent application WO 2017/103769 in the name of the Applicant, included therein as a reference [sample obtained after the extraction of latex, resin and rubber, referred to as "bagasse (2)" in the following examples].

Furthermore, since the production of fermentable sugars from biomass derived from guayule plants continues to be of particular interest, the development of new processes to bring about said production, which may produce the desired results, particularly in terms of sugar yield and of production of by-products, is also of great interest.

The Applicant therefore set itself the problem of identifying a process for the production of sugars from biomass derived from guayule plants, in particular from bagasse derived from the extraction processes to which said guayule plants are subjected, which would be able to overcome the aforementioned drawbacks. In particular, the Applicant has set itself the problem of identifying a process for the production of sugars from biomass derived from guayule plants which would be able to give a high conversion of the hemicellulose component and, consequently, a high yield of sugars having 5 carbon atoms (C5) and 6 carbon atoms (C6), in particular sugars having 5 carbon atoms (C5) such as xylose, arabinose (i.e. a yield of sugars 5 carbon atom (C5) and 6 carbon atom (C6) higher than or equal to 95%, said yield being calculated with respect to the total amount of hemicellulose present in the starting biomass) and a small amount of by-products (e.g., furfural (F), hydroxymethylfurfural (HMF)) (i.e. an amount of by-products lower than or equal to 5%, said amount being calculated as described below).

The Applicant has now found that the production of sugars from biomass derived from guayule plants, in particular from bagasse resulting from the extraction processes to which said guayule plants are subjected, may be advantageously carried out through a process comprising placing a certain amount of said biomass in contact with a certain amount of water and with at least one organic acid, and optionally at least one inorganic acid, obtaining a mixture, said at least one organic acid and said at least one inorganic acid optionally present being used in such amounts that the total moles of said at least one organic acid and said at least one inorganic acid optionally present contained in said mixture are calculated according to the specific equations and the specific algorithm below reported.

There are a number of advantages to be obtained through said process. For example, said process provides a high conversion of the hemicellulose component and, consequently, a high yield of sugars having 5 carbon atoms (C5) and 6 carbon atoms (C6), in particular of sugars having 5 carbon atoms (C5) such as xylose, arabinose (i.e. a yield of sugars having 5 carbon atom (C5) and 6 carbon atom (C6) higher than or equal to 95%, said yield being calculated with respect to the total amount of hemicellulose present in the starting biomass derived from guayule plants), deriving from acid hydrolysis of said biomass derived from guayule plants, which may then be used as sources of carbon in fermentation processes for the production of alcohols (e.g., ethanol, butanol), lipids, diols (e.g., 1,3-propanediol, 1,3-butanediol, 1,4-butanediol, 2,3-butanediol), or in chemical synthesis processes for the production of other intermediates or chemicals. Said alcohols and lipids may in turn advantageously be used in the production of biofuels (e.g. bio-diesel or "Green Diesel"), which may be used as such or in blends with other automotive fuels, while said diols may be used in the production of products such as, for example, bio-butadiene which may in turn be used in the production of rubbers (e.g. polybutadiene or its copolymers). Said uses are particularly important in the case of a biorefinery.

Furthermore, the possibility of obtaining extensive conversion of the hemicellulose component and, consequently, a high yield of sugars having 5 carbon atoms (C5) and 6 carbon atoms (C6), in particular of sugars having 5 carbon atoms (C5) such as xylose, arabinose, makes it possible to send solutions of sugars which are particularly rich in sugars having 5 carbon atoms (C5), or mixtures of said solutions of sugars which are particularly rich in sugars having 5 carbon atoms (C5) and solutions which are particularly rich in sugars having 6 carbon atoms (C6) (for example, solutions of sugars deriving from the enzymatic hydrolysis of cellulose) to subsequent fermentation and as a consequence to optimise said fermentation processes. It is in fact known that the microorganisms used in fermentation yield a fermented biomass with characteristics which differ in terms, for example, of the build-up of intermediate products and of unwanted metabolic products, depending on the sugars provided in the feedstock. It is also known that the microorganisms used in fermentation processes are susceptible to their food: for example, some strains of microorganisms do not tolerate an excessive amount of sugars having 5 carbon atoms (C5). It is therefore extremely advantageous to have two different types of sugar solutions, i.e. both sugar solutions particularly rich in sugars having 5 carbon atoms (C5) and sugar solutions particularly rich in sugars having 6 carbon atoms (C6) so that these sugar solutions are destined for different fermentation processes, consequently optimising said fermentation processes thanks to a better match with the food needs of the different strains of microorganisms.

It should also be noted that the amount of sugars having 5 carbon atoms (C5) and 6 carbon atoms (C6) obtained from the hydrolysis of hemicellulose depends on the nature of the starting guayule bagasse: it is in fact known, as mentioned above, that the amounts of cellulose, hemicellulose and lignin components vary depending on the type of biomass. Furthermore, said process makes it possible to operate over a wide range of temperatures (i.e. in a temperature range between 100° C. and 180° C.) and, even at high temperatures (i.e. temperatures of 140° C. or more), to obtain a small amount of by-products [e.g. furfural (F), hydroxymethylfurfural (HMF)] which, as mentioned above, act as inhibitors of the growth of microorganisms normally used in subsequent sugar fermentation processes.

Furthermore, the possibility of operating over said wide range of temperatures is a considerable advantage from an industrial point of view because unexpected temperature increases in reactors wherein the biomass is placed in contact with water, with at least one organic acid and, optionally, with at least one inorganic acid, do not give rise to a higher production of by-products [e.g. furfural (F), hydroxymethylfurfural (HMF)], as is generally the case in the processes of the known art.

Furthermore, the possibility of replacing some of said at least one organic acid with at least one inorganic acid makes it possible to obtain a cost saving and, therefore, an economic advantage.

Thus the object of the present invention is a process for the production of sugars from biomass derived from guayule plants comprising placing an amount of said biomass ($G_2$) (g) in contact with an amount of water ($G_1$) (g) and with at least one organic acid, and optionally at least one inorganic acid, obtaining a mixture, said at least one organic acid and said at least one inorganic acid optionally present being used in such amounts that the total moles of said at least one organic acid and said at least one inorganic acid optionally present ($m_{TOT}$) contained in said mixture are calculated according to the following equation (1):

$$m_{TOT} = m_1 + m_2 \quad (1)$$

wherein $m_1$ and $m_2$ are defined according to the following equations (2) and (3), respectively:

$$m_1 = R_1 \cdot G_1 \quad (2)$$

$$m_2 = R_2 \cdot G_2 \quad (3)$$

wherein:

$R_1$ (mmol/g) is the ratio between a first amount of said at least one organic acid (mmol) and a first amount of said at least one inorganic acid (mmol) optionally present and the amount of water $G_1$ (g) used, $R_1$ being between 0.06 mmol/g and 0.25 mmol/g, preferably between 0.09 mmol/g and 0.18 mmol/g, said first amount of said at least one organic acid (mmol) and said first amount of said at least one inorganic acid (mmol) optionally present being dependent upon the amount of water $G_1$ (g);

$R_2$ (mmol/g) is:

in the absence of said at least one inorganic acid, the ratio between a second amount of said at least one organic acid (mmol) and the amount of biomass $G_2$ (g) used; or in the presence of said at least one inorganic acid, the ratio between the sum of said second amount of said at least one organic acid (mmol) and of a second amount of said at least one inorganic acid (mmol) and the amount of biomass $G_2$ (g) used; or in the presence of said second amount of said at least one inorganic acid (mmol) and in the absence of said second amount of said at least one organic acid (mmol), the ratio between said second amount of said at least one inorganic acid (mmol) and the amount of biomass $G_2$ (g) used; said second amount of said at least one organic acid (mmol) and said second amount of said at least one inorganic acid (mmol) being dependent upon the amount of biomass $G_2$ (g);

$R_2$ being between 0.90 R (mmol/g) and 1.10 R (mmol/g), preferably between 0.95 R (mmol/g) and 1.05 R (mmol/g), R being determined by the following algorithm (4), said algorithm (4) being obtained through the following elementary operations:

(i) preparing a volume V (l) of an aqueous solution of said at least one organic acid and of said at least one first amount of said at least one inorganic acid (mmol) optionally present, said aqueous solution having a $pH_{(1)}$ lower than 7, preferably between 0.7 and 3;

(ii) adding an amount of biomass Q (g), dried at 120° C. for 15 hours, to the aqueous solution obtained in (i), said amount of biomass being preferably lower than or equal to 60% by weight, more preferably between 2% by weight and 40% by weight, with respect to the total weight of the mixture obtained;

(iii) measuring the pH of the mixture obtained in (ii), said pH being indicated below as $pH_{(2)}$;

(iv) determining R according to the following algorithm (4):

$$R = (10^{-pH_{(1)}} - 10^{-pH_{(2)}}) \cdot 1000 \cdot V/Q \quad (4)$$

wherein $pH_{(1)}$, $pH_{(2)}$, V and Q have the same meanings as above, the above elementary operations being carried out at room temperature;

provided that said at least one organic acid is present in an amount such that the ratio $R_{MINIMUM}$ (mmol/g) defined according to the following equation (5):

$$R_{MINIMUM} = m_{ORGANIC\ ACID}/G_2 \quad (5)$$

wherein $m_{ORGANIC\ ACID}$ is the mmol of organic acid present and $G_2$ has the same meaning as above, is higher than or equal to 0.20 mmol/g or more, preferably higher than or equal to 0.25 mmol/g, and, if said at least one inorganic acid is present, said mmol of organic acid ($m_{ORGANIC\ ACID}$) are present in an amount smaller than the sum of the two amounts of acid, that is the sum of the amount of inorganic acid (mmol) and of the amount of organic acid (mmol), said sum corresponding to the total moles $m_{TOT}$ (mmol) as defined in equation (1) above.

For the purposes of the present description and of the following claims, said algorithm is to be understood to be represented by an ordered and finite sequence of elementary operations that leads to a given result in a finite time. In particular, the operations constituting it are "elementary", that is, not capable of being further broken down; the elementary operations constituting it may be interpreted in a direct and univocal way by the operator, whether human or artificial, that is unambiguously; the algorithm is composed of a finite number of elementary operations and requires a finite amount of input data; execution ends after a finite time and execution leads to a unequivocal result.

For the purposes of the present description and of the following claims, the definitions of numeric ranges always include the extremes unless specified otherwise.

For the purposes of the present description and of the following claims, the term "comprising" also includes the terms "which essentially consists of" or "which consists of".

For the purposes of the present description and of the following claims, the term "guayule plants" refers generically to both the species Parthenium argentatum and the guayule plants of the species listed above.

For the purposes of the present description and of the following claims, the term "sugars having 5 carbon atoms (C5)" means pentose sugars, or more simply pentoses, which are monosaccharide carbohydrates composed of five carbon atoms having the chemical formula $C_5H_{10}O_5$. Similarly, for the purposes of the present description and of the following claims, the term "sugars having 6 carbon atoms (C6)" means hexose sugars, or more simply hexoses, which are monosaccharide carbohydrates composed of six carbon atoms having the chemical formula $C_6H_{12}O_6$.

For the purposes of the present description and of the following claims, the term "biomass deriving from guayule plants" means any form (for example, the whole plant, parts of the plant, including roots, branches and/or stems, leaves, bark if present, plant fragments obtained by shredding, grinding, etc., briquettes and pellets obtained by compacting plant fragments) wherein guayule plants are used to obtain latex, rubber, resin, bagasse, sugars, and the other components present in the plants themselves through chemical and/or physical methods.

For the purposes of the present description and of the following claims, "bagasse" means the residual amount of plant material resulting from the extraction processes to which guayule plants may be subjected. In addition to lignin and polysaccharides (e.g., cellulose and hemicellulose), bagasse may also contain small amounts of non-vegetable material (for example potting soil, sand, etc.) typically associated with plant roots and deriving from growing media.

For the purposes of the present description and of the following claims, the term "room temperature" means a temperature of between 15° C. and 30° C.

It should be noted that, for the purposes of the present invention, both the pH of the aqueous solution of said at least one organic acid and said at least one first amount of said at least one inorganic acid optionally present prepared in (i), i.e. $pH_{(1)}$, and the pH of the mixture obtained in (ii), i.e. $pH_{(2)}$, may be monitored using techniques known in the art. Preferably, for the purposes of the present invention, they are continuously monitored by a pH-meter.

According to a preferred embodiment of the present invention, said biomass derived from guayule plants is the bagasse deriving from the extraction processes to which said guayule plants are subjected.

As mentioned above, extraction processes to which guayule plants may be subjected in order to obtain bagasse are known in the art, as described, for example, in US patent application 2017/218094 or in international patent application WO 2017/103769 in the name of the Applicant mentioned above, or in U.S. Pat. No. 4,435,337 mentioned above. For the purposes of the present invention, said bagasse may preferably be obtained by operating as above, that is:

a bagasse obtained by operating according to the process described in Example 2 of U.S. Pat. No. 4,435,337, included therein as a reference [sample identified as GR-2 in said patent and referred to as "bagasse (1)" in the following examples]; or a bagasse obtained by operating according to the process described in Examples 1-3 of international patent application WO 2017/103769 in the name of the Applicant, included therein as a reference (sample obtained after the extraction of latex, resin and rubber, referred to as "bagasse (2)" in the following examples).

According to a preferred embodiment of the present invention, such biomass may be subjected to a preliminary grinding process before being placed in contact with water and with said at least one organic acid and with said at least one inorganic acid whihc optionally present. Preferably, said biomass may be ground to particles having a diameter of between 0.1 mm and 10 mm, more preferably between 0.5 mm and 4 mm. Particles having a diameter lower than 2 mm are particularly preferred.

According to a preferred embodiment of the present invention, said at least one organic acid may be selected, for example, from alkyl sulfonic acids having general formula (I):

$$R\text{—}SO_3H \tag{I}$$

wherein R represents a linear or branched $C_1$-$C_6$, preferably $C_1$-$C_3$, alkyl group.

According to a particularly preferred embodiment of the present invention, said at least one organic acid is methane sulfonic acid ($CH_3$—$SO_3H$).

According to a preferred embodiment of the present invention, said at least one inorganic acid may be selected, for example, from strong inorganic acids such as, for example, hydrochloric acid (HCl), nitric acid ($HNO_3$), sulfuric acid ($H_2SO_4$), or mixtures thereof.

According to a particularly preferred embodiment of the present invention, said at least one inorganic acid is sulfuric acid ($H_2SO_4$).

It should be noted that, for the purposes of the process that is the object of the present invention, the presence of at least one organic acid is essential. In fact, as will be evident from the following examples, the use of inorganic acid alone will not provide the high performance desired in terms of conversion of the hemicellulose present in the biomass derived from guayule plants, particularly in bagasse, and of selectivity for sugars. In fact the use of inorganic acid alone leads to poorer performance in terms of hemicellulose conversion and selectivity for sugars. Following said observation, it is also surprising that the partial replacement of organic acid by inorganic acid does not affect the performance of the process, which is in fact wholly comparable to that obtained using only organic acid. As mentioned above, the partial replacement of organic acid with inorganic acid leads to cost savings and, therefore, to an economic advantage.

According to a preferred embodiment of the present invention, said process for the production of sugars from biomass derived from guayule plants comprises:

(a) placing an amount of said biomass ($G_2$) (g) in contact with an amount of water ($G_1$) (g) and with at least one organic acid and optionally at least one inorganic acid in a reactor, resulting in a first reaction mixture;

(b) heating the reactor to the desired temperature, preferably between 100° C. and 180° C., more preferably between 130° C. and 150° C., in a time of between 20 minutes and 2 hours, preferably between 40 minutes and 1 hour, resulting in a second reaction mixture comprising a first solid phase and a first aqueous phase;

(c) optionally, holding said second reaction mixture comprising a first solid phase and a first aqueous phase at said desired temperature for a time of between 30 seconds and 1 hour, preferably between 5 minutes and 20 minutes;

(d) recovering said second reaction mixture from said reactor.

It should be noted that, for the purposes of the present invention, in stage (a) the sequence wherein the components, i.e. biomass, water, organic acid and optionally inorganic acid, are placed in contact is not relevant for the purposes of the present invention. In particular, any sequence wherein said components are placed in contact will constitute an embodiment of the present invention. The amounts of said at least one organic acid and optionally at least one inorganic acid must comply with the values of $R_1$, $R_2$ and $R_{MINIMUM}$ defined above.

According to a preferred embodiment of the present invention, said biomass may be present in said first reaction mixture in amounts of between 1% by weight and 60% by weight, preferably between 5% by weight and 45% by weight, even more preferably between 10% by weight and 30% by weight, with respect to the total weight of said first reaction mixture.

For the purposes of the present invention, said reactor may be selected from reactors known in the art such as, for example, autoclaves, fixed bed reactors, slurry reactors with continuous biomass feed (CSTR—Continuous Stirred-Tank Reactor), extruders. According to a preferred embodiment of the present invention, said reactor is selected from slurry reactors with continuous biomass feed (CSTR—Continuous Stirred-Tank Reactor).

According to a preferred embodiment of the present invention, said first solid phase includes lignin and cellulose and said first aqueous phase comprises at least one sugar having 5 carbon atoms (C5) and, optionally, at least one sugar having 6 carbon atoms (C6) and said at least one organic acid and, optionally, said at least one inorganic acid. Said at least one organic acid and optionally said at least one inorganic acid is the organic acid and the optionally inorganic acid which is placed in contact with biomass. Said at least one sugar is, in particular, xylose. Said xylose is derived from the acid hydrolysis of hemicellulose. Arabinose, mannose, galactose, glucose may also be present in said first aqueous phase.

Said first solid phase and said first aqueous phase may be separated by means of techniques known in the art such as, for example, filtration, centrifugation. Preferably, said phases are separated by filtration.

In order to recover said sugar having 5 carbon atoms (C5), said sugar having 6 carbon atoms (C6) optionally present and said at least one organic acid from said first aqueous phase, said first aqueous phase may be subjected to treatments known in the art. For example, said first aqueous phase may be subjected to a stage of separation by means of resins as described, for example, in U.S. Pat. No. 5,726,046 and U.S. Pat. No. 5,820,687. At the end of said stages, a further aqueous phase comprising said organic acid and optionally said at least one inorganic acid and a second aqueous phase comprising at least one sugar having 5 carbon atoms (C5) and, optionally, at least one sugar having 6 carbon atoms (C6), are obtained.

Said organic acid and said at least one inorganic acid optionally present, may then subsequently be reused according to the process which is the object of the present invention.

Said second aqueous phase, comprising at least one sugar having 5 carbon atoms (C5) and, optionally, at least one sugar having 6 carbon atoms (C6), may be used as such or in a mixture with solutions particularly rich in sugars having 6 carbon atoms (C6), in fermentation processes for the production of alcohols (e.g., ethanol, butanol), lipids, diols (e.g., 1,3 propanediol, 1,3-butanediol, 1,4-butanediol, 2,3-butanediol), or in chemical synthesis processes for the production of other intermediates or chemicals. Said alcohols and lipids may in turn advantageously be used in the production of biofuels (e.g., biodiesel or "Green Diesel"), which may be used as such or in blends with other automotive fuels, while said diols may be used in the production of products such as, for example, bio-butadiene which may in turn be used in the production of rubbers (e.g., polybutadiene or its copolymers). Said uses are particularly important in the case of a biorefinery.

As mentioned above, the process which is the object of the present invention makes it possible to obtain at least one sugar having 5 carbon atoms (C5) and, optionally, at least one sugar having 6 carbon atoms (C6), in particular at least one sugar having 5 carbon atoms (C5) such as xylose, arabinose, from the acid hydrolysis of hemicellulose, in high yield. More specifically, said process allows to obtain a yield of sugar having 5 carbon atoms (C5) and sugar having 6 carbon atoms (C6) higher than or equal to 95%, said yield being calculated with respect to the total amount of hemicellulose present in the starting biomass. In addition to this, the process which is the object of the present invention allows to obtain a content (%) of sugar having 5 carbon atoms (C5) higher than or equal to 70%, said content being calculated as described below.

The process that is the object of the present invention also makes it possible to obtain high yields of cellulose and lignin.

Said first solid phase comprising cellulose and lignin obtained according to the process which is the object of the present invention may be used in an enzymatic hydrolysis process to hydrolyse cellulose to glucose. The enzymatic hydrolysis process may be carried out according to techniques known in the art as described, for example, in U.S. Pat. Nos. 5,628,830, 5,916,780 and 6,090,595, using commercial enzymes such as Celluclast 1.5 L (Novozymes), Econase CE (Rohm Enzymes), Spezyme (Genecor), Novozym 188 (Novozymes), used individually or in a mixture of the same. From the enzymatic hydrolysis of said first solid phase a second solid phase comprising lignin and a third aqueous phase comprising glucose deriving from the hydrolysis of cellulose, are obtained.

Said second solid phase and said third liquid phase may be separated by techniques known in the art such as, for example, filtration or centrifugation. Preferably, said phases are separated by filtration.

Said third aqueous phase comprising glucose may be used as such or in a mixture with solutions particularly rich in sugars having 5 carbon atoms (C5) as a raw material in fermentation processes for alcohols (e.g., ethanol, butanol), lipids, diols (e.g., 1,3-propanediol, 1,3-butanediol, 1,4-butanediol, 2,3-butanediol), or in chemical synthesis processes for the production of other intermediates or chemicals. Said alcohols and lipids may in turn advantageously be used in the production of biofuels (e.g., biodiesel or "Green Diesel") which may be used as such or in blends with other automotive fuels, while said diols may be used in the production of products such as, for example, bio-butadiene which may in turn be used in the production of rubbers (e.g., polybutadiene or its copolymers). Said uses are particularly important in the case of a biorefinery. Said second solid phase comprising lignin may be used as a fuel, for example as a fuel to produce the energy needed to support biomass processing processes.

Fermentation processes are described in the art as, for example, in US patent application US 2013/0224333 and international patent application WO 2008/141317 (fermentation in the presence of yeasts); or in US patent application US 2010/0305341 and international patent application WO 2011/051977 (fermentation in the presence of genetically modified oleaginous yeasts); or in international patent application WO 2010/127319 (fermentation in the presence of genetically modified microorganisms). In order to better understand the present invention and to put it into practice some illustrative and non-limiting examples are described below.

Methods of Analysis and Characterisation

The methods of analysis and characterisation listed below have been used.

Analysis of the Starting Biomass

The starting biomass was analysed using Van Soest's fibrous fraction system to quantify the constituents of cell walls, in particular hemicellulose, cellulose and lignin, as described, for example, in Van Soest, P. J. and Wine, R. H. "Use of detergents in the analysis of fibrous feeds. IV. Determination of plant cell-wall constituents", *Journal of Association of Official Analytical Chemistry* (1967), Vol. 50, pg. 50-55.

Analysis of the Compounds Present in the First Aqueous Phase

The sugars present in the first aqueous phase were analysed by ion chromatography using the following operating conditions:
 Instrument: Dionex IC3000, PA100 column;
 eluent: sodium hydroxide (NaOH) (100 mM)—sodium acetate ($CH_3COONa$) 0.6 M in 200 mM of sodium hydroxide (NaOH);
 elution programme: gradient, electrochemical detector.

By-products, i.e. furfural (F) and hydroxymethylfurfural (HMF) present in the first aqueous phase, were analysed by liquid chromatography using the following operating conditions:
 Instrument: HP 1100, Inertsil C18 column;
 eluent: 0.01 M phosphoric acid—acetonitrile (CH3CN);
 elution programme: gradient, UV-DAD detector.

Calculation of yield, of content of sugars having 5 carbon atoms (C5) and of by-products production Yield was expressed on the basis of the analytical results (i.e. analysis of the compounds present in the first aqueous phase carried out as described above), as the percentage ratio between the sugars having 5 carbon atoms (C5) and 6 carbon atoms (C6) [i.e. pentoses (C5) and hexoses (C6), respectively] present in said first aqueous phase and the total amount of hemicellulose present in the starting biomass, according to the following formula:

$$Yield = (mC5+mC6)/mHEMICELLULOSE*100$$

wherein:
 C5=pentoses present in solution;
 C6=hexoses present in solution;
 m=weight of the compound;
 HEMICELLULOSE=hemicellulose present in the starting biomass.

For each example the content (%) of sugars having 5 carbon atoms (C5) (i.e. pentoses) present in the first aqueous phase was also determined according to the following formula:

$$Content\ C5 = mC5/(mC5+mC6)0.100$$

wherein C5, C6 and m have the same meanings as described above.

In order to effectively express the production of by-products, i.e. hydroxymethylfurfural (HMF) and furfural (F), degradation ratios were calculated according to the following formulas:

$$C6\ degradation\ ratio = mHMF/(mC6+mHMF)0.100$$

$$C5\ degradation\ ratio = mF/(mC5+mF)*100$$

wherein C5, C6 and m have the same meanings as described above;
 F=furfural;
 HMF=hydroxymethylfurfural.

Determination of R According to Algorithm (4)

The same process was followed for both bagasse (1) and bagasse (2). In detail, a solution of methanesulfonic acid ($CH_3$—$SO_3H$) was prepared at pH=0.9 by adding a suitable amount of methanesulfonic acid ($CH_3$—$SO_3H$) to 100 ml of water at room temperature, kept vigorously stirred at 600 rpm by means of a magnetic stirrer, in a 200 ml beaker. The operation was monitored by the electrode of a pH-meter (Metrohm 781 pH/Ion meter) placed in contact with the solution. 21 g of biomass [bagasse (1) or bagasse (2), respectively] were added to said solution. The resulting mixture was kept constantly vigorously stirred (600 rpm) during the addition operation and subsequently until the pH is stabilized: the pH-meter electrode (Metrohm 781, pH/Ion meter) was kept in contact with the resulting mixture during the entire sequence of operations. Said pH stability was achieved 15 minutes after addition, at a pH of 2.02. Algorithm (4), which is shown below for convenience, was then used to determine the value of R:

$$R = (10^{-pH}{}_{(1)} - 10^{-pH}{}_{(2)}) \cdot 1000 \cdot V/Q$$

wherein:
 $pH_{(1)} = 0,9$;
 $pH_{(2)} = 2,02$;
 $V(l) = 0,1$;
 $Q(g) = 21$;
 obtaining a value R=0.55 mmol/g, for both bagasse (1) and bagasse (2).

EXAMPLE 1 (COMPARATIVE)

885 g of water and 10.7 g (111.3 mmol) of methanesulfonic acid ($CH_3$—$SO_3H$) (first amount of organic acid) were placed in a 2 l Brignole autoclave in the open air ($R_1$=0.13 mmol/g). Subsequently, 135 g of bagasse (1) derived from previously ground guayule plants (*Parthenium argentatum*) (sieved to below 2 mm) was added ($R_2$=0.00 mmol/g; $R_{MINIMUM}$=0.82 mmol/g).

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 42.3% by weight of cellulose, 18.2% by weight of hemicellulose, 24.1% by weight of lignin, with respect to the total weight of the starting biomass. The remaining part was made up of organic acids, protein and non-protein nitrogen substances, lipids, mineral salts, resin and residual rubber.

The first aqueous phase was analysed as described above, obtaining the following results (shown in Table 1):
yield: 80.3% (with respect to the total amount of hemicellulose present in the starting biomass);
C6 degradation: 0.0%;
C5 degradation: 0.7%;
C5 content: 79.4%.

EXAMPLE 2 (COMPARATIVE)

885 g of water and 10.7 g (109.1 mmol) of sulfuric acid (H2SO4) (first amount of inorganic acid) were placed in a 2 l Brignole autoclave in the open air ($R_1$=0.12 mmol/g).

Subsequently, 135 g of bagasse (1) derived from previously ground guayule plants (*Parthenium argentatum*) (sieved to below 2 mm) was added ($R_2$=0.00 mmol/g; $R_{MINIMUM}$=0.00 mmol/g).

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 42.3% by weight of cellulose, 18.2% by weight of hemicellulose, 24.1% by weight of lignin, with respect to the total weight of the starting biomass. The remaining part was made up of organic acids, protein and non-protein nitrogen substances, lipids, mineral salts, resin and residual rubber.

The first aqueous phase was analysed as described above, obtaining the following results (shown in Table 1):
yield: 69.1% (with respect to the total amount of hemicellulose present in the starting biomass);
C6 degradation: 1.7%;
C5 degradation: 3.2%;
C5 content: 72.6%.

EXAMPLE 3 (INVENTION)

885 g of water and 10.7 g (111.3 mmol) of methanesulfonic acid ($CH_3$—$SO_3H$) (first amount of organic acid) were placed in a 2 l Brignole autoclave in the open air ($R_1$=0.13 mmol/g). Subsequently, 135 g of bagasse (1) derived from previously ground guayule plants (*Parthenium argentatum*) (sieved to below 2 mm) were added. Finally, 7.1 g (73.9 mmol) of methanesulfonic acid ($CH_3$—$SO_3H$) (second amount of organic acid) determined according to equation (1) and following equations ($R_2$=0.55 mmol/g; $R_{MINIMUM}$=1.37 mmol/g) was added: in total $m_{TOT}$=185.2 mmol were added.

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 42.3% by weight of cellulose, 18.2% by weight of hemicellulose, 24.1% by weight of lignin, with respect to the total weight of the starting biomass. The remaining part was made up of organic acids, protein and non-protein nitrogen substances, lipids, mineral salts, resin and residual rubber.

The first aqueous phase was analysed as described above, obtaining the following results (shown in Table 1):
yield: 95.0% (with respect to the total amount of hemicellulose present in the starting biomass);
C6 degradation: 0.0%;
C5 degradation: 4.6%;
C5 content: 80.5%.

EXAMPLE 4 (COMPARATIVE)

885 g of water and 10.7 g (111.3 mmol) of methanesulfonic acid ($CH_3$—$SO_3H$) (first amount of organic acid) were placed in a 2 l Brignole autoclave in the open air ($R_1$=0.13 mmol/g). Subsequently, 135 g of bagasse (2) derived from previously ground guayule plants (*Parthenium argentatum*) (sieved to below 2 mm) was added ($R_2$=0.00 mmol/g; $R_{MINIMUM}$ 0.82 mmol/g).

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 47.0% by weight of cellulose, 20.2% by weight of hemicellulose, 26.8% by weight of lignin, with respect to the total weight of the starting biomass. The remaining part was made up of organic acids, protein and non-protein nitrogen substances, lipids and mineral salts. The first aqueous phase was analysed as described above, obtaining the following results (shown in Table 2):
yield: 79.9% (with respect to the total amount of hemicellulose present in the starting biomass);
C6 degradation: 0.0%;
C5 degradation: 0.6%;
C5 content: 80.4%.

EXAMPLE 5 (COMPARATIVE)

885 g of water and 10.7 g (109.1 mmol) of sulfuric acid ($H_2SO_4$) (first amount of inorganic acid) were placed in a 2 l Brignole autoclave in the open air ($R_1$=0.12 mmol/g). Subsequently, 135 g of bagasse (2) derived from previously ground guayule plants (*Parthenium argentatum*) (sieved to below 2 mm) was added ($R_2$=0.00 mmol/g; $R_{MINIMUM}$=0.00 mmol/g).

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 47.0% by weight of cellulose, 20.2% by weight of hemicellulose, 26.8% by weight of lignin, with respect to the total weight of the starting biomass. The remaining part was made up of organic acids, protein and non-protein nitrogen substances, lipids and mineral salts. The first aqueous phase was analysed as described above, obtaining the following results (shown in Table 2):
- yield: 68.4% (with respect to the total amount of hemicellulose present in the starting biomass);
- C6 degradation: 2.4%;
- C5 degradation: 3.6%;
- C5 content: 70.1%.

EXAMPLE 6 (INVENTION)

885 g of water and 10.7 g (111.3 mmol) of methanesulfonic acid ($CH_3$—$SO_3H$) (first amount of organic acid) were placed in a 2 l Brignole autoclave in the open air ($R_1$=0.13 mmol/g). Subsequently, 135 g of bagasse (2) derived from previously ground guayule plants (*Parthenium argentatum*) (sieved to below 2 mm) was added. Finally, 7.1 g (73.9 mmol) of methanesulfonic acid ($CH_3$—$SO_3H$) (second amount of organic acid) determined according to equation (1) and following equations ($R_2$=0.55 mmol/g; $R_{MINIMUM}$=1.37 mmol/g) was added: in total $m_{TOT}$=185.2 mmol was added.

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 47.0% by weight of cellulose, 20.2% by weight of hemicellulose, 26.8% by weight of lignin, with respect to the total weight of the starting biomass. The remaining part was made up of organic acids, protein and non-protein nitrogen substances, lipids and mineral salts. The first aqueous phase was analysed as described above, obtaining the following results (shown in Table 2):
- yield: 95.2% (with respect to the total amount of hemicellulose present in the starting biomass);
- C6 degradation: 0.0%;
- C5 degradation: 4.4%;
- C5 content: 80.7%.

EXAMPLE 7 (INVENTION)

885 g of water and 10.7 g (111.3 mmol) of methanesulfonic acid ($CH_3$—$SO_3H$) (first amount of organic acid) were placed in a 2 l Brignole autoclave in the open air ($R_1$=0.13 mmol/g). Subsequently, 135 g of bagasse (1) derived from previously ground guayule plants (*Parthenium argentatum*) (sieved to below 2 mm) was added. Finally, 7.1 g (72.4 mmol) of sulfuric acid ($H_2SO_4$) (second amount of inorganic acid) determined according to equation (1) and following equations ($R_2$=0.54 mmol/g; $R_{MINIMUM}$=0.82 mmol/g) was added: in total $m_{TOT}$=183.7 mmol was added.

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 42.3% by weight of cellulose, 18.2% by weight of hemicellulose, 24.1% by weight of lignin, with respect to the total weight of the starting biomass. The remaining part was made up of organic acids, protein and non-protein nitrogen substances, lipids, mineral salts, resin and residual rubber.

The first aqueous phase was analysed as described above, obtaining the following results (shown in Table 1 and Table 3):
- yield: 95.1% (with respect to the total amount of hemicellulose present in the starting biomass);
- C6 degradation: 0.0%;
- C5 degradation: 4.5%;
- C5 content: 80.1%.

EXAMPLE 8 (INVENTION)

885 g of water and 10.7 g (111.3 mmol) of methanesulfonic acid ($CH_3$—$SO_3H$) (first amount of organic acid) were placed in a 2 l Brignole autoclave in the open air ($R_1$=0.13 mmol/g). Subsequently, 135 g of bagasse (2) derived from previously ground guayule plants (*Parthenium argentatum*) (sieved to below 2 mm) was added. Finally, 7.1 g (72.4 mmol) of sulfuric acid ($H_2SO_4$) (second amount of inorganic acid) determined according to equation (1) and following equations ($R_2$=0.54 mmol/g; $R_{MINIMUM}$=0.82 mmol/g) was added: in total $m_{TOT}$=183.7 mmol was added.

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 47.0% by weight of cellulose, 20.2% by weight of hemicellulose, 26.8% by weight of lignin, with respect to the total weight of the starting biomass. The remaining part was made up of organic acids, protein and non-protein nitrogen substances, lipids and mineral salts. The first aqueous phase was analysed as described above, obtaining the following results (shown in Table 2 and Table 4):
- yield: 95.4% (with respect to the total amount of hemicellulose present in the starting biomass);
- C6 degradation: 0.0%;
- C5 degradation: 4.5%;
- C5 content: 80.3%.

EXAMPLE 9 (COMPARATIVE)

885 g of water and 10.7 g (111.3 mmol) of methanesulfonic acid ($CH_3$—$SO_3H$) (first amount of organic acid) were placed in a 2 l Brignole autoclave in the open air ($R_1$=0.13 mmol/g). Subsequently, 135 g of bagasse (1) derived from previously ground guayule plants (*Parthenium argentatum*) (sieved to below 2 mm) was added. Finally, 3.0 g (30.6 mmol) of sulfuric acid ($H_2SO_4$) (second amount of inorganic acid), lower than that determined according to equation (1)

and following equations ($R_2=0.23$ mmol/g; $R_{MINIMUM}=0.82$ mmol/g) was added: in total $m_{TOT}=141.9$ mmol was added.

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 42.3% by weight of cellulose, 18.2% by weight of hemicellulose, 24.1% by weight of lignin, with respect to the total weight of the starting biomass. The remaining part was made up of organic acids, protein and non-protein nitrogen substances, lipids, mineral salts, resin and residual rubber.

The first aqueous phase was analysed as described above, obtaining the following results (shown in Table 3):
  yield: 87.8% (with respect to the total amount of hemicellulose present in the starting biomass);
  C6 degradation: 0.0%;
  C5 degradation: 3.9%;
  C5 content: 80.1%.

EXAMPLE 10 (COMPARATIVE)

885 g of water and 10.7 g (111.3 mmol) of methanesulfonic acid ($CH_3-SO_3H$) (first amount of organic acid) were placed in a 2 l Brignole autoclave in the open air ($R_1=0.13$ mmol/g). Subsequently, 135 g of bagasse (1) derived from previously ground guayule plants (*Parthenium argentatum*) (sieved to below 2 mm) was added. Finally, 11.0 g (112.2 mmol) of sulfuric acid ($H_2SO_4$) (second amount of inorganic acid), more than that determined according to equation (1) and following equations ($R_2=0.82$ mmol/g; $R_{MINIMUM}=0.82$ mmol/g) was added: in total $m_{TOT}=223.5$ mmol was added.

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 42.3% by weight of cellulose, 18.2% by weight of hemicellulose, 24.1% by weight of lignin, with respect to the total weight of the starting biomass. The remaining part was made up of organic acids, protein and non-protein nitrogen substances, lipids, mineral salts, resin and residual rubber.

The first aqueous phase was analysed as described above, obtaining the following results (shown in Table 3):
  yield: 86.1% (with respect to the total amount of hemicellulose present in the starting biomass);
  C6 degradation: 0.0%;
  C5 degradation: 7.2%;
  C5 content: 74.3%.

EXAMPLE 11 (COMPARATIVE)

885 g of water and 10.7 g (111.3 mmol) of methanesulfonic acid ($CH_3-SO_3H$) (first amount of organic acid) were placed in a 2 l Brignole autoclave in the open air ($R_1=0.13$ mmol/g). Subsequently, 135 g of bagasse (2) derived from previously ground guayule plants (*Parthenium argentatum*) (sieved to below 2 mm) were added. Finally, 3.0 g (30.6 mmol) of sulfuric acid ($H_2SO_4$) (second amount of inorganic acid), lower than that determined according to equation (1) and following equations ($R_2=0.23$ mmol/g; $R_{MINIMUM}=0.82$ mmol/g) was added: in total $m_{TOT}=141.9$ mmol was added.

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 47.0% by weight of cellulose, 20.2% by weight of hemicellulose, 26.8% by weight of lignin, with respect to the total weight of the starting biomass. The remaining part was made up of organic acids, protein and non-protein nitrogen substances, lipids and mineral salts. The first aqueous phase was analysed as described above, obtaining the following results (shown in Table 4):
  yield: 84.7% (with respect to the total amount of hemicellulose present in the starting biomass);
  C6 degradation: 0.0%;
  C5 degradation: 3.2%;
  C5 content: 80.5%.

EXAMPLE 12 (COMPARATIVE)

885 g of water and 10.7 g (111.3 mmol) of methanesulfonic acid ($CH_3-SO_3H$) (first amount of organic acid) were placed in a 2 l Brignole autoclave in the open air ($R_1=0.13$ mmol/g). Subsequently, 135 g of bagasse (2) derived from previously ground guayule plants (*Parthenium argentatum*) (sieved to below 2 mm) was added. Finally, 11.0 g (112.2 mmol) of sulfuric acid ($H_2SO_4$) (second amount of inorganic acid), more than that determined according to equation (1) and following equations ($R_2=0.82$ mmol/g; $R_{MINIMUM}=0.82$ mmol/g) was added: in total $m_{TOT}=223.5$ mmol was added.

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 47.0% by weight of cellulose, 20.2% by weight of hemicellulose, 26.8% by weight of lignin, with respect to the total weight of the starting biomass. The remaining part was made up of organic acids, protein and non-protein nitrogen substances, lipids and mineral salts. The first aqueous phase was analysed as described above, obtaining the following results (shown in Table 4):
  yield: 86.3% (with respect to the total amount of hemicellulose present in the starting biomass);
  C6 degradation: 4.3%;
  C5 degradation: 7.4%;
  C5 content: 71.3%.

EXAMPLE 13 (INVENTION)

885 g of water, 5.3 g (55.14 mmol) of methanesulfonic acid ($CH_3-SO_3H$) (first amount of organic acid) and 5.5 g (56.2 mmol) of sulfuric acid ($H_2SO_4$) (first amount of inorganic acid) ($R_1$=0.13 mmol/g) were placed in a 2 l Brignole autoclave in the open air. Subsequently, 135 g of bagasse (1) derived from previously ground guayule plants (*Parthenium argentatum*) (sieved to below 2 mm) was added. Finally, an additional 7.0 g (71.4 mmol) of sulfuric acid ($H_2SO_4$) (second amount of inorganic acid), determined according to equation (1) and following equations ($R_2$=0.53 mmol/g; $R_{MINIMUM}$=0.41 mmol/g) was added: in total $m_{TOT}$=182.7 mmol was added.

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 42.3% by weight of cellulose, 18.2% by weight of hemicellulose, 24.1% by weight of lignin, with respect to the total weight of the starting biomass. The remaining part was made up of organic acids, protein and non-protein nitrogen substances, lipids, mineral salts, resin and residual rubber.

The first aqueous phase was analysed as described above, obtaining the following results (shown in Table 5):
  yield: 96.0% (with respect to the total amount of hemicellulose present in the starting biomass);
  C6 degradation: 0.0%;
  C5 degradation: 4.6%;
  C5 content: 81.2%.

EXAMPLE 14 (INVENTION)

885 g of water, 3.3 g (34.3 mmol) of methanesulfonic acid ($CH_3$—$SO_3H$) (first amount of organic acid) and 7.6 g (77.5 mmol) of sulfuric acid ($H_2SO_4$) (first amount of inorganic acid) ($R_1$=0.13 mmol/g) were placed in a 2 l Brignole autoclave in the open air. Subsequently, 135 g of bagasse (1) derived from previously ground guayule plants (*Parthenium argentatum*) (sieved to below 2 mm) was added. Finally, an additional 7.0 g (71.4 mmol) of sulfuric acid ($H_2SO_4$) (second amount of inorganic acid) determined according to equation (1) and following equations ($R_2$=0.53 mmol/g; $R_{MINIMUM}$=0.25 mmol/g) was added: in total $m_{TOT}$=183.2 mmol was added.

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 42.3% by weight of cellulose, 18.2% by weight of hemicellulose, 24.1% by weight of lignin, with respect to the total weight of the starting biomass. The remaining part was made up of organic acids, protein and non-protein nitrogen substances, lipids, mineral salts, resin and residual rubber.

The first aqueous phase was analysed as described above, obtaining the following results (shown in Table 5):
  yield: 95.4% (with respect to the total amount of hemicellulose present in the starting biomass);
  C6 degradation: 0.0%;
  C5 degradation: 4.2%;
  C5 content: 79,8%.

EXAMPLE 15 (COMPARATIVE)

885 g of water, 2.1 g (21.8 mmol) of methanesulfonic acid ($CH_3$—$SO_3H$) (first amount of organic acid) and 8.7 g (88.7 mmol) of sulfuric acid ($H_2SO_4$) (first amount of inorganic acid) ($R_1$=0.13 mmol/g) were placed in a 2 l Brignole autoclave in the open air. Subsequently, 135 g of bagasse (1) derived from previously ground guayule plants (*Parthenium argentatum*) (sieved to below 2 mm) was added. Finally, an additional 7.0 g (71.4 mmol) of sulfuric acid ($H_2SO_4$) (second amount of inorganic acid) was added according to equation (1) and following equations ($R_2$=0.53 mmol/g; $R_{MINIMUM}$=0.16 mmol/g) was added: in total $m_{TOT}$=181.9 mmol was added.

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 42.3% by weight of cellulose, 18.2% by weight of hemicellulose, 24.1% by weight of lignin, with respect to the total weight of the starting biomass. The remaining part was made up of organic acids, protein and non-protein nitrogen substances, lipids, mineral salts, resin and residual rubber.

The first aqueous phase was analysed as described above, obtaining the following results (shown in Table 5):
  yield: 81.4% (with respect to the total amount of hemicellulose present in the starting biomass);
  C6 degradation: 0.0%;
  C5 degradation: 1.1%;
  C5 content: 79.2%.

EXAMPLE 16 (INVENTION)

885 g of water, 5.3 g (55.14 mmol) of methanesulfonic acid ($CH_3$—$SO_3H$) (first amount of organic acid) and 5.5 g (56.2 mmol) of sulfuric acid ($H_2SO_4$) (first amount of inorganic acid) ($R_1$=0.13 mmol/g) were placed in a 2 l Brignole autoclave in the open air. Subsequently, 135 g of bagasse (2) derived from previously ground guayule plants (*Parthenium argentatum*) (sieved to below 2 mm) was added. Finally, an additional 7.0 g (71.4 mmol) of sulfuric acid ($H_2SO_4$) (second amount of inorganic acid), determined according to equation (1) and following equations ($R_2$=0.53 mmol/g; $R_{MINIMUM}$=0.41 mmol/g) was added: in total $m_{TOT}$=182.7 mmol were added.

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 47.0% by weight of cellulose, 20.2% by weight of hemicellulose, 26.8% by weight of lignin, with respect to the total weight of the starting biomass. The remaining part was made up of organic acids, protein and non-protein nitrogen substances, lipids and mineral salts.

The first aqueous phase was analysed as described above, obtaining the following results (shown in Table 6):
  yield: 95.2% (with respect to the total amount of hemicellulose present in the starting biomass);
  C6 degradation: 0.0%;
  C5 degradation: 4.3%;
  C5 content: 80.7%.

EXAMPLE 17 (INVENTION)

885 g of water, 3.3 g (34.3 mmol) of methanesulfonic acid ($CH_3$—$SO_3H$) (first amount of organic acid) and 7.6 g (77.5 mmol) of sulfuric acid ($H_2SO_4$) (first amount of inorganic acid) ($R_1$=0.13 mmol/g) were placed in a 2 l Brignole autoclave in the open air. Subsequently, 135 g of bagasse (2) derived from previously ground guayule plants (*Parthenium argentatum*) (sieved to below 2 mm) was added. Finally, an additional 7.0 g (71.4 mmol) of sulfuric acid ($H_2SO_4$) (second amount of inorganic acid), determined according to equation (1) and following equations ($R_2$=0.53 mmol/g; $R_{MINIMUM}$=0.25 mmol/g) was added: in total $m_{TOT}$=183.2 mmol was added.

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 47.0% by weight of cellulose, 20.2% by weight of hemicellulose, 26.8% by weight of lignin, with respect to the total weight of the starting biomass. The remaining part was made up of organic acids, protein and non-protein nitrogen substances, lipids and mineral salts.

The first aqueous phase was analysed as described above, obtaining the following results (shown in Table 6):
  yield: 95.0% (with respect to the total amount of hemicellulose present in the starting biomass);
  C6 degradation: 0.0%;
  C5 degradation: 4.6%;
  C5 content: 81.2%.

EXAMPLE 18 (COMPARATIVE)

885 g of water, 2.1 g (21.8 mmol) of methanesulfonic acid ($CH_3$—$SO_3H$) (first amount of organic acid) and 8.7 g (88.7 mmol) of sulfuric acid ($H_2SO_4$) (first amount of inorganic acid) ($R_1$=0.13 mmol/g), were placed in a 2 l Brignole autoclave in the open air. Subsequently, 135 g of bagasse (1) derived from previously ground guayule plants (*Parthenium argentatum*) (sieved to below 2 mm) was added. Finally, an additional 7.0 g (71.4 mmol) of sulfuric acid ($H_2SO_4$) (second amount of inorganic acid), determined according to equation (1) and following equations ($R_2$=0.53 mmol/g; $R_{MINIMUM}$=0.16 mmol/g) was added: in total $m_{TOT}$=181.9 mmol was added.

The first reaction mixture thus obtained was kept vigorously stirred (600 rpm) until it reached a temperature of 140° C. within 45 minutes, resulting in a second reaction mixture comprising a first solid phase containing lignin and cellulose and a first aqueous phase containing the sugars deriving from hemicellulose.

After allowing the autoclave to cool to room temperature, said phases were separated by filtration.

The composition of the starting biomass, determined as described above, was as follows: 47.0% by weight of cellulose, 20.2% by weight of hemicellulose, 26.8% by weight of lignin, with respect to the total weight of the starting biomass. The remaining part was made up of organic acids, protein and non-protein nitrogen substances, lipids and mineral salts. The first aqueous phase was analysed as described above, obtaining the following results (shown in Table 6):
  yield: 79.4% (with respect to the total amount of hemicellulose present in the starting biomass);
  C6 degradation: 0.0%;
  C5 degradation: 1.5%;
  C5 content: 78,8%.

TABLE 1

Results obtained from the acid hydrolysis of bagasse (1)

| Example | $m_1$ (mmol) | $m_2$ (mmol) | $R_1$ (mmol/g) | $R_2$ (mmol/g) | $R_{MINIMUM}$ (mmol/g) | Yield (%) | C6 degradation (%) | C5 degradation (%) | C5 content (%) |
|---|---|---|---|---|---|---|---|---|---|
| 1 (comp.) | $CH_3$—$SO_3H$(*) (111.3) | — | 0.13 | 0.00 | 0.82 | 80.3 | 0.0 | 0.7 | 79.4 |
| 2 (comp.) | $H_2SO_4$(*) (109.1) | — | 0.12 | 0.00 | 0.00 | 69.1 | 1.7 | 3.2 | 72.6 |
| 3 (inv.) | $CH_3$—$SO_3H$(*) (111.3) | $CH_3$—$SO_3H$(**) (73.9) | 0.13 | 0.55 | 1.37 | 95.0 | 0.0 | 4.6 | 80.5 |
| 7 (inv.) | $CH_3$—$SO_3H$(*) (111.3) | $H_2SO_4$(**) (72.4) | 0.13 | 0.54 | 0.82 | 95.1 | 0.0 | 4.5 | 80.1 |

(*)moles of acid, with respect to the amount of water ($G_1$), determined according to equation (1) shown above;

(**)moles of acid, with respect to the amount of biomass ($G_2$), determined according to equation (1) shown above.

TABLE 2

Results obtained from the acid hydrolysis of bagasse (2)

| Example | $m_1$ (mmol) | $m_2$ (mmol) | $R_1$ (mmol/g) | $R_2$ (mmol/g) | $R_{MINIMUM}$ (mmol/g) | Yield (%) | C6 degradation (%) | C5 degradation (%) | C5 content (%) |
|---|---|---|---|---|---|---|---|---|---|
| 4 (comp.) | $CH_3-SO_3H^{(*)}$ (111.3) | — | 0.13 | 0.00 | 0.82 | 79.9 | 0.0 | 0.6 | 80.4 |
| 5 (comp.) | $H_2SO_4^{(*)}$ (109.1) | — | 0.12 | 0.00 | 0.00 | 68.4 | 2.4 | 3.6 | 70.1 |
| 6 (inv.) | $CH_3-SO_3H^{(*)}$ (111.3) | $CH_3-SO_3H^{(**)}$ (73.9) | 0.13 | 0.55 | 1.37 | 95.2 | 0.0 | 4.4 | 80.7 |
| 8 (inv.) | $CH_3-SO_3H^{(*)}$ (111.3) | $H_2SO_4^{(**)}$ (72.4) | 0.13 | 0.54 | 0.82 | 95.4 | 0.0 | 4.5 | 80.3 |

$^{(*)}$moles of acid, with respect to the amount of water ($G_1$), determined according to equation (1) shown above;
$^{(**)}$moles of acid, with respect to the amount of biomass ($G_2$), determined according to equation (1) shown above.

TABLE 3

Results obtained from the acid hydrolysis of bagasse (1) with varying amounts of $H_2SO_4$

| Example | $m_1$ (mmol) | $m_2$ (mmol) | $R_1$ (mmol/g) | $R_2$ (mmol/g) | $R_{MINIMUM}$ (mmol/g) | Yield (%) | C6 degradation (%) | C5 degradation (%) | C5 content (%) |
|---|---|---|---|---|---|---|---|---|---|
| 7 (inv.) | $CH_3-SO_3H^{(*)}$ (111.3) | $H_2SO_4^{(**)}$ (72.4) | 0.13 | 0.54 | 0.82 | 95.1 | 0.0 | 4.5 | 80.1 |
| 9 (comp.) | $CH_3-SO_3H^{(*)}$ (111.3) | $H_2SO_4^{(**)}$ (shortfall) (30.6) | 0.13 | 0.23 | 0.82 | 87.8 | 0.0 | 3.9 | 80.1 |
| 10 (comp.) | $CH_3-SO_3H^{(*)}$ (111.3) | $H_2SO_4^{(**)}$ (excess) (112.2) | 0.13 | 0.82 | 0.82 | 86.1 | 1.1 | 7.2 | 74.3 |

$^{(*)}$moles of acid, with respect to the amount of water ($G_1$), determined according to equation (1) shown above;
$^{(**)}$moles of acid, with respect to the amount of biomass ($G_2$), determined according to equation (1) shown above.

TABLE 4

Results obtained from the acid hydrolysis of bagasse (2) with varying amounts of $H_2SO_4$

| Example | $m_1$ (mmol) | $m_2$ (mmol) | $R_1$ (mmol/g) | $R_2$ (mmol/g) | $R_{MINIMUM}$ (mmol/g) | Yield (%) | C6 degradation (%) | C5 degradation (%) | C5 content (%) |
|---|---|---|---|---|---|---|---|---|---|
| 8 (inv.) | $CH_3-SO_3H^{(*)}$ (111.3) | $H_2SO_4^{(**)}$ (72.4) | 0.13 | 0.54 | 0.82 | 95.4 | 0.0 | 4.5 | 80.3 |
| 11 (comp.) | $CH_3-SO_3H^{(*)}$ (111.3) | $H_2SO_4^{(**)}$ (shortfall) (30.6) | 0.13 | 0.23 | 0.82 | 84.7 | 0.0 | 3.2 | 80.5 |
| 12 (comp.) | $CH_3-SO_3H^{(*)}$ (111.3) | $H_2SO_4^{(**)}$ (excess) (112.2) | 0.13 | 0.82 | 0.82 | 86.3 | 4.3 | 7.4 | 71.3 |

$^{(*)}$moles of acid, with respect to the amount of water ($G_1$), determined according to equation (1) shown above;
$^{(**)}$moles of acid, with respect to the amount of biomass ($G_2$), determined according to equation (1) shown above.

TABLE 5

Results obtained from the acid hydrolysis of bagasse (1) for different $R_{MINIMUM}$ ratios (mmol/g)$^{(*)}$

| Example | $R_1$ (mmol/g) | $R_2$ (mmol/g) | $R_{MINIMUM}$ (mmol/g) | Yield (%) | C6 degradation (%) | C5 degradation (%) | C5 content (%) |
|---|---|---|---|---|---|---|---|
| 13 (inv.) | 0.13 | 0.53 | 0.41 | 96.0 | 0.0 | 4.6 | 81.2 |
| 14 (inv.) | 0.13 | 0.53 | 0.25 | 95.4 | 0.0 | 4.2 | 79.8 |
| 15 (comp.) | 0.13 | 0.53 | 0.16 | 81.4 | 0.0 | 1.1 | 79.2 |

$^{(*)}R_{MINIMUM}$ (mmol/g) defines the ratio between the moles of organic acid ($CH_3-SO_3H$) (mmol) and biomass ($G_2$) used; in order to obtain the total moles of acid $m_{TOT}$, according to equation (1) shown above, the inorganic acid $H_2SO_4$ was used.

TABLE 6

Results obtained from the acid hydrolysis of bagasse
(2) for different $R_{MINIMUM}$ ratios(mmol/g)(*)

| Example | $R_1$ (mmol/g) | $R_2$ (mmol/g) | $R_{MINIMUM}$ (mmol/g) | Yield (%) | C6 degradation (%) | C5 degradation (%) | C5 content (%) |
|---|---|---|---|---|---|---|---|
| 16 (inv.) | 0.13 | 0.53 | 0.41 | 95.2 | 0.0 | 4.3 | 80.7 |
| 17 (inv.) | 0.13 | 0.53 | 0.25 | 95.0 | 0.0 | 4.6 | 81.2 |
| 18 (comp.) | 0.13 | 0.53 | 0.16 | 79.4 | 0.0 | 1.5 | 78.8 |

(*)$R_{MINIMUM}$ (mmol/g) defines the ratio between the moles of organic acid ($CH_3$—$SO_3H$) (mmol) and biomass ($G_2$) used; in order to obtain the total moles of acid $m_{TOT}$, according to equation (1) shown above, the inorganic acid $H_2SO_4$ was used.

The data shown in Table 1 [bagasse (1)] show that:

Example 1 (comparative), wherein an amount $m_1$ (mmol) of methanesulfonic acid ($CH_3$—$SO_3H$) was used with respect to the amount of water ($G_1$) used, without further addition of the amount $m_2$ (mmol) of organic or inorganic acid determined according to equation (1) and following equations, has a low yield of sugars [Yield (%)](80.3%); furthermore, from the examination of the parameters $R_1$=0.13 mmol/g, $R_2$=0.00 mmol/g and $R_{MINIMUM}$=0.82 mmol/g, it is clear that the value of $R_2$ is not in accordance with the present invention;

Example 2 (comparative), wherein an amount $m_1$ (mmol) of sulfuric acid ($H_2SO_4$) was used with respect to the amount of water ($G_1$) used, without further addition of the amount $m_2$ (mmol) of organic or inorganic acid determined according to equation (1) and the following equations, has a low yield of sugars [Yield (%)] (69.1%), lower than that in Example 1 (comparative); furthermore, with respect to Example 1 (comparative), hydroxymethylfurfural (HMF) is observed to form in not insignificant amounts (degradation ratio equal to 1.7%), together with a marked increase in degradation to furfural (F) (degradation ratio equal to 3.2%); furthermore, from the examination of the parameters $R_1$=0.12 mmol/g, $R_2$=0.00 mmol/g and $R_{MINIMUM}$=0.00 mmol/g, it is clear that the values of $R_2$ and $R_{MINIMUM}$ are not in accordance with the present invention;

Example 3 (invention), wherein an amount $m_1$ (mmol) of methanesulfonic acid ($CH_3$—$SO_3H$) was used with respect to the amount of water ($G_1$) used and an amount $m_2$ (mmol) of methanesulfonic acid ($CH_3$—$SO_3H$) was used with respect to the amount of biomass ($G_2$) used, determined according to equation (1) and the following equations, has a high yield of sugars [Yield (%)] (95.0%); also no formation of hydroxymethylfurfural (HMF) is observed (degradation ratio equal to 0.0%); furthermore, from the examination of the parameters $R_1$=0.13 mmol/g, $R_2$=0.55 mmol/g and $R_{MINIMUM}$=1.37 mmol/g, it is clear that the values of $R_1$, $R_2$ and $R_{MINIMUM}$ are in accordance with the present invention;

Example 7 (invention), wherein an amount $m_1$ (mmol) of methanesulfonic acid ($CH_3$—$SO_3H$) was used with respect to the amount of water ($G_1$) used and an amount $m_2$ (mmol) of sulfuric acid ($H_2SO_4$) was used with respect to the amount of biomass ($G_2$) used, determined according to equation (1) and the following equations, has a high yield of sugars [Yield (%)] (95.1%) comparable with that in Example 3 (invention); finally, a degradation to furfural (F) (degradation ratio equal to 4.5%) is observed comparable to that obtained in Example 3 (invention) confirming, therefore, that the use of sulfuric acid ($H_2SO_4$) does not adversely affect either the sugar yield or degradation to furfural; furthermore, from the examination of the parameters $R_1$=0.13 mmol/g, $R_2$=0.54 mmol/g and $R_{MINIMUM}$=0.82 mmol/g, it is clear that the values of $R_1$, $R_2$ and $R_{MINIMUM}$ are in accordance with the present invention.

The data shown in Table 2 ((bagasse (2)) show that:

Example 4 (comparative), wherein an amount $m_1$ (mmol) of methanesulfonic acid ($CH_3$—$SO_3H$) was used with respect to the amount of water $G_1$ used, without further addition of the amount $m_2$ (mmol) of organic or inorganic acid determined according to equation (1) and the following equations, has a low yield of sugars [Yield (%)](79.9%); furthermore, from the examination of the parameters $R_1$=0.13 mmol/g, $R_2$=0.00 mmol/g and $R_{MINIMUM}$=0.82 mmol/g, it is clear that the value of $R_2$ is not in accordance with the present invention;

Example 5 (comparative), wherein an amount $m_1$ (mmol) of sulfuric acid ($H_2SO_4$) was used with respect to the amount of water ($G_1$) used, without further addition of the amount $m_2$ (mmol) of organic or inorganic acid determined according to equation (1) and the following equations, has a low yield of sugars [Yield (%)](68.4%) and lower than that in Example 5 (comparative); furthermore, with respect to Example 5 (comparative), hydroxymethylfurfural (HMF) is observed to form in non-negligible amounts (degradation ratio equal to 2.4%), together with a marked increase in furfural (F) degradation (degradation ratio equal to 3.6%); furthermore, from the examination of the parameters $R_1$=0.12 mmol/g, $R_2$=0.00 mmol/g and $R_{MINIMUM}$=0.00 mmol/g, it is clear that the values of $R_2$ and $R_{MINIMUM}$ are not in accordance with the present invention;

Example 6 (invention), wherein an amount $m_1$ (mmol) of methanesulfonic acid ($CH_3$—$SO_3H$) was used with respect to the amount of water ($G_1$) used and an amount $m_2$ (mmol) of methanesulfonic acid ($CH_3$—$SO_3H$) was used with respect to the amount of biomass ($G_2$) used, determined according to equation (1) and the following equations, has a high yield of sugars [Yield (%)] (95.2%); furthermore, no formation of hydroxymethylfurfural (HMF) is observed (degradation ratio equal to 0.0%); furthermore, from the examination of the parameters $R_1$=0.13 mmol/g, $R_2$=0.55 mmol/g and $R_{MINIMUM}$=1.37 mmol/g, it is clear that the values of $R_1$, $R_2$ and $R_{MINIMUM}$ are in accordance with the present invention;

Example 8 (invention), wherein an amount $m_1$ (mmol) of methanesulfonic acid ($CH_3$—$SO_3H$) was used with respect to the amount of water ($G_1$) used and an amount $m_2$ (mmol) of sulfuric acid ($H_2SO_4$) was used with respect to the amount of biomass ($G_2$) used, determined according to equation (1) and the following equations, has a high yield of sugars [Yield (%)] (95.4%) comparable with that in Example 6 (invention); finally, there is degradation to furfural (F) (degradation ratio equal to 4.5%) comparable to that in Example 6 (invention) confirming, therefore, that the use of sulfuric acid ($H_2SO_4$) does not adversely affect either the sugar yield or degradation to furfural; furthermore, from the examination of the parameters $R_1$=0.13 mmol/g, $R_2$=0.54 mmol/g and $R_{MINIMUM}$=0.82 mmol/g, it is clear that the values of $R_1$, $R_2$ and $R_{MINIMUM}$, are in accordance with the present invention.

The data shown in Table 3 [bagasse (1)] show that:

Example 7 (invention), wherein an amount $m_1$ (mmol) of methanesulfonic acid ($CH_3$—$SO_3H$) was used with respect to the amount of water $G_1$ used and an amount $m_2$ (mmol) of sulfuric acid ($H_2SO_4$) was used with respect to the amount of biomass ($G_2$) used, determined according to equation (1) and the following equations, has a high yield of sugars [Yield (%)] (95.1%); furthermore, no formation of hydroxymethylfurfural (HMF) is observed (degradation ratio equal to 0.0%); furthermore, from the examination of the parameters $R_1$=0.13 mmol/g, $R_2$=0.54 mmol/g and $R_{MINIMUM}$=0.82 mmol/g, it is clear that the values of $R_1$, $R_2$ and $R_{MINIMUM}$, are in accordance with the present invention;

Example 9 (comparative), wherein an amount $m_1$ (mmol) of methanesulfonic acid ($CH_3$—$SO_3H$) was used with respect to the amount of water ($G_1$) used and an amount $m_2$ (mmol) of sulfuric acid ($H_2SO_4$) was used with respect to the amount of biomass ($G_2$) used, lower than that determined according to equation (1) and the following equations, has a lower yield of sugars [Yield (%)] (87.8%) than that in Example 7 (invention); furthermore, from the examination of the parameters $R_1$=0.13 mmol/g, $R_2$=0.23 mmol/g and $R_{MINIMUM}$=0.82 mmol/g, it is clear that the value of $R_2$ is not in accordance with the present invention;

Example 10 (comparative), wherein an amount $m_1$ (mmol) of methanesulfonic acid ($CH_3$—$SO_3H$) was used with respect to the amount of water ($G_1$) used and an amount $m_2$ (mmol) of sulfuric acid ($H_2SO_4$) was used with respect to the amount of biomass ($G_2$) used, higher than that determined according to equation (1) and the following equations, has a lower yield of sugars [Yield (%)] (86.1%) than that in Example 7 (invention); there is also a marked increase in degradation to furfural (F) (degradation ratio equal to 7.2%); furthermore, examination of parameters $R_1$=0.13 mmol/g, $R_2$=0.82 mmol/g and $R_{MINIMUM}$=0.82 mmol/g, it is clear that the value of $R_2$ is not in accordance with the present invention.

The data shown in Table 4 [bagasse (2)] shows that:

Example 8 (invention), wherein an amount $m_1$ (mmol) of methanesulfonic acid ($CH_3$—$SO_3H$) was used with respect to the amount of water ($G_1$) used and an amount $m_2$ (mmol) of sulfuric acid ($H_2SO_4$) was used with respect to the amount of biomass ($G_2$) used, determined according to equation (1) and the following equations, has a high yield of sugars [Yield (%)] (95.4%); furthermore, no formation of hydroxymethylfurfural (HMF) is observed (degradation ratio equal to 0.0%); furthermore, from the examination of the parameters $R_1$=0.13 mmol/g, $R_2$=0.54 mmol/g and $R_{MINIMUM}$=0.82 mmol/g, shows that the values of $R_1$, $R_2$ and $R_{MINIMUM}$, are in accordance with the present invention;

Example 11 (comparative), wherein an amount $m_1$ (mmol) of methanesulfonic acid ($CH_3$—$SO_3H$) was used with respect to the amount of water ($G_1$) used and an amount $m_2$ (mmol) of sulfuric acid ($H_2SO_4$) was used with respect to the amount of biomass ($G_2$) used, lower than that determined according to equation (1) and the following equations, has a lower yield of sugars [Yield (%)] 84.7%) than that in Example 8 (invention); furthermore, from the examination of the parameters $R_1$=0.13 mmol/g, $R_2$=0.23 mmol/g and $R_{MINIMUM}$=0.82 mmol/g, shows that the value of $R_2$ is not in accordance with the present invention;

Example 12 (comparative), wherein an amount $m_1$ (mmol) of methanesulfonic acid ($CH_3$—$SO_3H$) was used with respect to the amount of water ($G_1$) used and an amount $m_2$ (mmol) of sulfuric acid ($H_2SO_4$) was used with respect to the amount of biomass $G_2$ used, higher than that determined according to equation (1) and the following equations, has a lower yield of sugars (Yield (%) 86.3%) than that in Example 8 (invention); there is also a marked increase in degradation to furfural (F) (degradation ratio between 7.4%); furthermore, from the examination of the parameters $R_1$=0.13 mmol/g, $R_2$=0.82 mmol/g and $R_{MINIMUM}$=0.82 mmol/g, shows that the value of $R_2$ is not in accordance with the present invention;

The data shown in Table 5 [bagasse (1)] show that:

Example 13 (invention), wherein methanesulfonic acid ($CH_3$—$SO_3H$) and sulfuric acid ($H_2SO_4$) were used has a high yield of sugars [Yield (%)] (95.1%) and degradation to furfural (F) (degradation ratio equal to 4.6%) comparable to that obtained in Examples 3, 6, 7 and 8 (invention) confirming, therefore, that the use of sulfuric acid ($H_2SO_4$) does not adversely affect either sugar yield or degradation to furfural; in particular, from the examination of the parameters $R_1$=0.13 mmol/g, $R_2$=0.53 mmol/g and $R_{MINIMUM}$=0.41 mmol/g shows that the values of $R_1$, $R_2$ and $R_{MINIMUM}$, are in accordance with the present invention; Example 14 (invention), wherein methanesulfonic acid ($CH_3$—$SO_3H$) and sulfuric acid ($H_2SO_4$) were used has a high yield of sugars [Yield (%)] (95.4%) and degradation to furfural (F) (degradation ratio equal to 4,2%) comparable to that obtained in Examples 3, 6, 7 and 8 (invention) confirming, therefore, that the use of sulfuric acid ($H_2SO_4$) does not adversely affect either sugar yield or degradation to furfural; in particular, from the examination of the parameters $R_1$=0.13 mmol/g, $R_2$=0.53 mmol/g and $R_{MINIMUM}$=0.25 mmol/g, shows that the values of $R_1$, $R_2$ and $R_{MINIMUM}$, are in accordance with the present invention;

Example 15 (comparative), wherein methanesulfonic acid ($CH_3$—$SO_3H$) and sulfuric acid ($H_2SO_4$) were used has a low yield of sugars [Yield (%)] (81,4%); in particular, from the examination of the parameters $R_1$=0.13 mmol/g, $R_2$=0.53 mmol/g and $R_{MINIMUM}$=0.16 mmol/g, shows that the value of $R_{MINIMUM}$ is not in accordance with the present invention (i.e. insufficient amount of organic acid is present).

The data shown in Table 6 [bagasse (2)] show that:

Example 16 (invention), wherein methanesulfonic acid ($CH_3$—$SO_3H$) and sulfuric acid ($H_2SO_4$) were used has a high yield of sugars [Yield (%)] (95.2%) and degradation to furfural (F) (degradation ratio equal to 4,3%)

comparable to that obtained in Examples 3, 6, 7 and 8 (invention) confirming, therefore, that the use of sulfuric acid ($H_2SO_4$) does not adversely affect either sugar yield, or degradation to furfural; in particular, from the examination of the parameters $R_1$=0.13 mmol/g, $R_2$=0.53 mmol/g and $R_{MINIMUM}$=0.41 mmol/g, shows that the values of $R_1$, $R_2$ and $R_{MINIMUM}$, are in accordance with the present invention;

Example 17 (invention), wherein methanesulfonic acid ($CH_3$—$SO_3H$) and sulfuric acid ($H_2SO_4$) were used has a high yield of sugars (Yield (%) 95.0%) and degradation to furfural (F) (degradation ratio between 4.6%) comparable to that obtained in Examples 3, 6, 7 and 8 (invention) confirming, therefore, that the use of sulfuric acid ($H_2SO_4$) does not adversely affect either sugar yield, or degradation to furfural; in particular, from the examination of parameters $R_1$=0.13 mmol/g, $R_2$=0.53 mmol/g and $R_{MINIMUM}$=0.25 mmol/g shows that the values, of $R_1$, $R_2$ and $R_{MINIMUM}$, are in accordance with the present invention;

Example 18 (comparative), wherein methanesulfonic acid ($CH_3$—$SO_3H$) and sulfuric acid ($H_2SO_4$) were used has a low yield of sugars [Yield (%)] (79.4%); in particular, from the examination the of parameters $R_1$=0.13 mmol/g, $R_2$=0.53 mmol/g and $R_{MINIMUM}$=0.16 mmol/g, shows that the value of $R_{MINIMUM}$ is not in accordance with the present invention (i.e. insufficient amount of organic acid is present).

It should also be noted that using bagasse (1) or bagasse (2) gives comparable results, supporting the fact that the process for obtaining bagasse is irrelevant for the purposes of the present invention.

What is claimed is:

1. A process for the production of sugars from biomass derived from guayule plants comprising placing an amount of said biomass $G_2$ in grams (g) in contact with an amount of water $G_1$ in g and with at least one organic acid, and optionally at least one inorganic acid, obtaining a mixture, wherein said at least one organic acid and said at least one inorganic acid optionally present being used in such amounts that the total moles of said at least one organic acid and said at least one inorganic acid optionally present $m_{TOT}$ contained in said mixture are calculated according to the following equation (1):

$$m_{TOT} = m_1 + m_2 \quad (1)$$

wherein $m_1$ and $m_2$ are defined according to the following equations (2) and (3), respectively:

$$m_1 = R_1 \cdot G_1 \quad (2)$$

$$m_2 = R_2 \cdot G_2 \quad (3)$$

wherein:

$R_1$ in mmol/g is the ratio of a first amount of said at least one organic acid in mmol and a first amount of said at least one inorganic acid in mmol optionally present to the amount of water $G_1$ in g used, $R_1$ being between 0.06 mmol/g and 0.25 mmol/g, said first amount of said at least one organic acid in mmol and said first amount of said at least one inorganic acid in mmol optionally present being dependent upon the amount of water $G_1$ in g;

$R_2$ in mmol/g is:

in the absence of said at least one inorganic acid, the ratio between a second amount of said at least one organic acid in mmol and the amount of biomass $G_2$ in g used; or in the presence of said at least one inorganic acid, the ratio between the sum of said second amount of said at least one organic acid in mmol and of a second amount of said at least one inorganic acid in mmol and the amount of biomass $G_2$ in g used; or in the presence of said second amount of said at least one inorganic acid in mmol and in the absence of said second amount of said at least one organic acid in mmol, the ratio between said second amount of said at least one inorganic acid in mmol and the amount of biomass $G_2$ in g used; said second amount of said at least one organic acid in mmol and said second amount of said at least one inorganic acid in mmol being dependent upon the amount of biomass $G_2$ in g;

$R_2$ being between 0.90 R in mmol/g and 1.10 R in mmol/g, R being determined by means of the following algorithm (4), said algorithm (4) being obtained through the following elementary operations:

(i) preparing a volume V in L of an aqueous solution of said at least one organic acid that is the same or different from said first amount of said at least one organic acid and said at least a first amount of said at least one inorganic acid in mmol optionally present, said aqueous solution having a $pH_{(1)}$ lower than 7;

(ii) adding an amount of biomass Q in g, dried at 120° C. for 15 h, to the aqueous solution obtained in (i), said amount of biomass being lower than or equal to 60% by weight with respect to the total weight of the mixture obtained;

(iii) measuring the pH of the mixture obtained in (ii), said pH being referred to below as $pH_{(2)}$;

(iv) determining R according to the following algorithm (4):

$$R = (10^{-pH_{(1)}} - 10^{-pH_{(2)}}) \cdot 1000 \cdot V/Q \quad (4)$$

wherein $pH_{(1)}$, $pH_{(2)}$, V and Q have the same meanings as above, the above elementary operations being carried out at room temperature;

provided that said at least one organic acid is present in an amount such that an $R_{MINIMUM}$ ratio in mmol/g defined according to the following equation (5):

$$R_{MINIMUM} = m_{ORGANIC\ ACID}/G_2 \quad (5)$$

wherein $m_{ORGANIC\ ACID}$ is a mmol of organic acid present and $G_2$ has the same meaning as above, $R_{MINIMUM}$ is greater than or equal to 0.20 mmol/g, and, if said at least one inorganic acid is present, said mmol of organic acid in $m_{ORGANIC\ ACID}$ is present in an amount smaller than the sum of the two amounts of acid, that is the sum of the amount of inorganic acid in mmol in equation (1) above and of the amount of organic acid in mmol in equation (1) above, said sum corresponding to the total $m_{TOT}$ in mmol moles as defined in equation (1) above.

2. The process for the production of sugars from biomass derived from guayule plants according to claim 1, wherein said biomass derived from guayule plants is a bagasse derived from an extraction process to which said guayule plants are subjected.

3. The process for the production of sugars from biomass derived from guayule plants according to claim 1, wherein said biomass is subjected to a preliminary grinding process before being placed in contact with water and with said at least one organic acid and optionally at least one inorganic acid.

4. The process for the production of sugars from biomass derived from guayule plants according to claim 1, wherein said at least one organic acid is selected from alkylsulfonic acids having general formula (I):

$$R-SO_3H \quad (I)$$

wherein R represents a linear or branched $C_1$-$C_6$ alkyl group.

5. The process for the production of sugars from biomass derived from guayule plants according to claim 1, wherein said at least one inorganic acid is at least one strong inorganic acid selected from the group consisting of: hydrochloric acid (HCl), nitric acid ($HNO_3$), sulfuric acid ($H_2SO_4$), and mixtures thereof.

6. The process for the production of sugars from biomass derived from guayule plants according to claim 1, wherein said process comprises:
(a) placing an amount of said biomass $G_2$ in g in contact with an amount of water $G_1$ in g and with at least one organic acid and optionally at least one inorganic acid, in a reactor, obtaining a first reaction mixture;
(b) heating the reactor to the desired temperature between 100° C. and 180° C., in a time of between 20 minutes and 2 hours, obtaining a second reaction mixture comprising a first solid phase and a first aqueous phase;
(c) optionally, holding said second reaction mixture comprising a first solid phase and a first aqueous phase at said desired temperature for a time of between 30 seconds and 1 hour;
(d) recovering said second reaction mixture from said reactor.

7. The process for the production of sugars from biomass derived from guayule plants according to claim 6, wherein:
said biomass is present in said first reaction mixture in in amounts of between 1% by weight and 60% by weight, with respect to the total weight of said first reaction mixture; and/or
said reactor is selected from slurry reactors with continuous biomass feed; and/or
said first solid phase comprises lignin and cellulose and said first aqueous phase comprises at least one sugar having 5 carbon atoms or at least one sugar having 5 carbon atoms and at least one sugar having 6 carbon atoms, and said at least one organic acid and optionally said at least one inorganic acid.

8. The process for the production of sugars from biomass derived from guayule plants according to claim 1, wherein said guayule plants are of the species *Parthenium argentatum*.

9. The process for the production of sugars from biomass derived from guayule plants according to claim 1, wherein R1 is between 0.09 mmol/g and 0.18 mmol/g.

10. The process for the production of sugars from biomass derived from guayule plants according to claim 1, wherein the $pH_{(1)}$ is between 0.7 and 3.

11. The process for the production of sugars from biomass derived from guayule plants according to claim 1, wherein R2 is between 0.95 R in mmol/g and 1.05 R in mmol/g.

12. The process for the production of sugars from biomass derived from guayule plants according to claim 1, wherein said amount of biomass Q is between 2% by weight and 40% by weight.

13. The process for the production of sugars from biomass derived from guayule plants according to claim 1, wherein $R_{MINIMUM}$ is greater than or equal to 0.25 mmol/g.

14. The process for the production of sugars from biomass derived from guayule plants according to claim 3, wherein said biomass is ground to obtain particles having a diameter of between 0.5 mm and 4 mm.

15. The process for the production of sugars from biomass derived from guayule plants according to claim 3, wherein said biomass is ground to obtain particles having a diameter of lower than 2 mm.

16. The process for the production of sugars from biomass derived from guayule plants according to claim 3, wherein said biomass is ground to obtain particles having a diameter of between 0.1 mm and 10 mm.

17. The process for the production of sugars from biomass derived from guayule plants according to claim 4, wherein R represents a linear or branched $C_1$-$C_3$, alkyl group.

18. The process for the production of sugars from biomass derived from guayule plants according to claim 4, wherein R represents methanesulfonic acid ($CH_3$—$SO_3H$).

19. The process for the production of sugars from biomass derived from guayule plants according to claim 5, wherein the strong inorganic acid is sulfuric acid ($H_2SO_4$).

20. The process for the production of sugars from biomass derived from guayule plants according to claim 1, wherein said process comprises:
(a) placing an amount of said biomass $G_2$ in g in contact with an amount of water $G_1$ in g and with at least one organic acid and at least one inorganic acid, in a reactor, thereby obtaining a first reaction mixture;
(b) heating the reactor to the desired temperature between 100° C. and 180° C., in a time of between 20 minutes and 2 hours, thereby obtaining a second reaction mixture comprising a first solid phase and a first aqueous phase;
(d) optionally, holding said second reaction mixture comprising a first solid phase and a first aqueous phase at said desired temperature for a time of between 30 seconds and 1 hour; and
(e) recovering said second reaction mixture from said reactor.

* * * * *